United States Patent
Jiang et al.

(10) Patent No.: US 12,440,184 B2
(45) Date of Patent: *Oct. 14, 2025

(54) ULTRASONIC DEVICE FOR COUPLING AN ULTRASONIC COUPLING GEL AND ULTRASONIC HEAD

(71) Applicant: JKH Health Co., Ltd., Shenzhen (CN)

(72) Inventors: Pu Jiang, Shenzhen (CN); Baohua Jiang, Shenzhen (CN); Quanqin Dai, Shenzhen (CN)

(73) Assignee: JKH Health Co., Ltd., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/741,279

(22) Filed: Jun. 12, 2024

(65) Prior Publication Data
US 2024/0324990 A1  Oct. 3, 2024

Related U.S. Application Data

(63) Continuation-in-part of application No. 18/300,292, filed on Apr. 13, 2023, now Pat. No. 12,029,612.

(51) Int. Cl.
*A61B 8/00* (2006.01)

(52) U.S. Cl.
CPC .......... *A61B 8/4281* (2013.01); *A61B 8/4444* (2013.01)

(58) Field of Classification Search
CPC ..................... A61B 8/4281; A61B 8/4444
See application file for complete search history.

(56) References Cited

U.S. PATENT DOCUMENTS

2005/0240102 A1  10/2005  Rachlin et al.
2013/0144193 A1*  6/2013  Lewis, Jr. ............ A61B 8/4281
    601/2

(Continued)

FOREIGN PATENT DOCUMENTS

| CN | 107334489 A | * 11/2017 | ........... A61B 8/4281 |
| CN | 107616813 A | 1/2018 | |
| WO | 2014156258 A1 | 10/2014 | |

OTHER PUBLICATIONS

CN107334489A (Angel Medical Tech Nanjing Co Ltd). Translated by Espacenet. Oct. 11, 2017. [retrieved Jul. 18, 2024 ] (Year: 2017).*

(Continued)

*Primary Examiner* — Keith M Raymond
*Assistant Examiner* — Andrew W Begeman
(74) *Attorney, Agent, or Firm* — Arch & Lake LLP

(57) ABSTRACT

The present disclosure provides an ultrasonic device including an ultrasonic head connected to the body through a lead wire or wirelessly, a fixing piece and an ultrasonic coupling gel. The fixing piece includes a cover plate and a peripheral wall circumferentially connected with the cover plate. The peripheral wall is sleeved on the ultrasonic head to realize connection between the fixing piece and the ultrasonic head, and at the same time, an accommodation space is formed between the ultrasonic head and the cover plate. The ultrasonic coupling gel includes a first connecting part that is accommodated in the accommodation space and respectively attached to the ultrasonic head and the cover plate. Close connection between the ultrasonic coupling gel and the ultrasonic head is realized by arranging the first connecting part between the ultrasonic head and the cover plate, so that the force on the first connecting part is more uniform.

18 Claims, 15 Drawing Sheets

(56) References Cited

U.S. PATENT DOCUMENTS

| | | | |
|---|---|---|---|
| 2014/0180116 A1* | 6/2014 | Lindekugel | A61B 8/4455 |
| | | | 600/459 |
| 2014/0236016 A1* | 8/2014 | Morgan | A61B 8/4483 |
| | | | 600/459 |
| 2014/0276077 A1* | 9/2014 | Morgan | A61B 8/4281 |
| | | | 600/459 |
| 2014/0336512 A1* | 11/2014 | Mehi | A61B 8/4483 |
| | | | 600/443 |
| 2016/0106390 A1* | 4/2016 | Vezina | A61B 8/58 |
| | | | 600/459 |
| 2019/0247679 A1* | 8/2019 | Vincenot | A61B 8/4411 |

OTHER PUBLICATIONS

WO2014156258A1 (Hitachi Aloka Medical Ltd). Translated by Espacenet. Mar. 27, 2013. [retrieved May 16, 2023] (Year: 2013).
CN107616813A (Shenzhen Qianzhikang Medical Product Co Ltd) Translated by Espacenet. Nov. 1, 2017. [ retrieved May 17, 2023] (Year: 2017).

* cited by examiner

ULTRASONIC DEVICE FOR COUPLING AN ULTRASONIC COUPLING GEL AND ULTRASONIC HEAD

CROSS-REFERENCES TO RELATED APPLICATIONS

This application is a continuation-in-part of U.S. patent application Ser. No. 18/300,292, filed on Apr. 13, 2023, which claims priority of Chinese Utility Model Patent No. CN 217696625U filed on May 25, 2022, the disclosures of both of which are hereby incorporated by reference in their entireties for all purposes.

TECHNICAL FIELD

The present disclosure relates to the technical field of medical instruments, in particular to an ultrasonic device.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present disclosure, or any embodiments thereof, to anything stated or implied therein or inferred thereupon.

Existing ultrasound devices generally include an ultrasound head and an ultrasound coupling gel, and the ultrasound generated by the ultrasound head can act on the treatment site through the ultrasound coupling gel in contact with the skin. Ultrasonic coupling gel is generally in a liquid state and is inconvenient to clean. It is also possible to use solid-state ultrasonic coupling gel, which is a large piece of solid-state ultrasonic coupling gel that attaches on the human body, which is inconvenient to fix and high in cost.

SUMMARY

In order to solve the problem above, it is necessary to provide an ultrasonic device aimed at solving the technical problem of inconvenient use or high cost of the ultrasonic coupling gel in the existing ultrasonic device.

In a first aspect, the present disclosure provides an ultrasound device, comprising: a body;
an ultrasonic head, configured to be connected to the body through a lead wire or wirelessly and is configured to generate ultrasound; and
a fixing piece comprising a cover plate and a peripheral wall circumferentially and vertically connected with the cover plate; where the peripheral wall is sleeved on the ultrasonic head to form an accommodation space between the ultrasonic head and the cover plate; a first through hole is provided on the cover plate, and the first through hole communicates with the accommodation space; and
an ultrasonic coupling gel configured for ultrasound to pass through; where the ultrasonic coupling gel comprises a first connecting part and a protruding part; the first connecting part is accommodated in the accommodation space and directly attached to the ultrasonic head and the cover plate respectively and simultaneously; and the protruding part is arranged on the first connecting part and is exposed outside the fixing piece through the first through hole;
where the ultrasonic head comprises a first clamping part, and the first clamping part comprises one or more first protruding structures; a portion of the peripheral wall that is separate from a side of the cover plate comprises a second clamping part, and the second clamping part is around a peripheral wall of a circumferential protruding structure or one or more second protruding structures; an inner part of the peripheral wall comprises an annular groove that is coupled with the circumferential protruding structure or the one or more second protruding structures; the first clamping part protrudes into the annular groove of the second clamping part, and the peripheral wall is configured to be sleeved on the ultrasonic head; and
where a circumferential direction of the circumferential protruding structure or the one or more second protruding structures comprises corners bending toward the inner part of the peripheral wall, and the corners guide and cooperate with the first clamping part in the one or more first protruding structures to accelerate assemblance of the fixing piece and the ultrasonic head.

In a second aspect, the present disclosure provides an ultrasound device assembling method, comprising:
assembling a body;
arranging an ultrasonic head to be connected to the body through a lead wire or wirelessly, wherein the ultrasonic head is configured to generate ultrasound;
arranging a fixing piece, wherein the fixing piece comprises a cover plate and a peripheral wall circumferentially and vertically connected with the cover plate, and arranging the fixing piece comprises sleeving the peripheral wall on the ultrasonic head to form an accommodation space between the ultrasonic head and the cover plate; providing a first through hole on the cover plate, and configuring the first through hole to communicate with the accommodation space; and
arranging an ultrasonic coupling gel configured for ultrasound to pass through, wherein the ultrasonic coupling gel comprises a first connecting part and a protruding part, the first connecting part is accommodated in the accommodation space and attached to the ultrasonic head and the cover plate respectively, and arranging the ultrasonic coupling gel comprises arranging the protruding part on the first connecting part and exposing the protruding part outside the fixing piece through the first through hole;
where the ultrasonic head comprises a first clamping part, and the first clamping part comprises one or more first protruding structures; a portion of the peripheral wall that is separate from a side of the cover plate comprises a second clamping part, and the second clamping part is around a peripheral wall of a circumferential protruding structure or one or more second protruding structures; an inner part of the peripheral wall comprises an annular groove that is coupled with the circumferential protruding structure or the one or more second protruding structures; the first clamping part protrudes into the annular groove of the second clamping part, and the peripheral wall is configured to be sleeved on the ultrasonic head; and
where a circumferential direction of the circumferential protruding structure or the one or more second protruding structures comprises corners bending toward the inner part of the peripheral wall, and the corners guide and cooperate with the first clamping part in the one or more first protruding structures to accelerate assemblance of the fixing piece and the ultrasonic head.

BRIEF DESCRIPTION OF THE DRAWINGS

The disclosure will now be described, by way of example, with reference to the accompanying drawings, in which.

DETAILED DESCRIPTION

Figure 1:
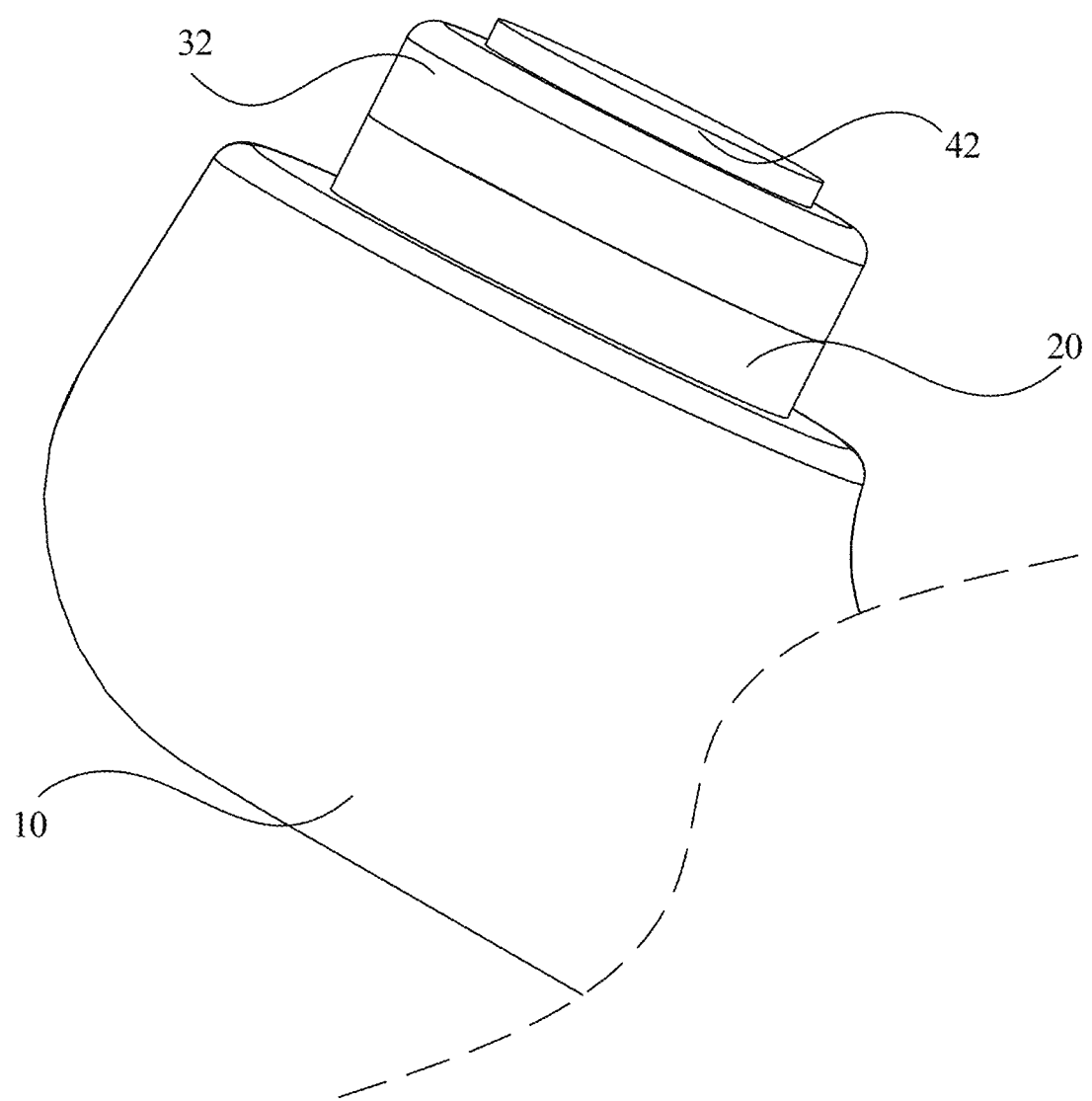
FIG. 1 is a partial schematic diagram of an ultrasonic device in a first embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the disclosure as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

In addition, terms such as "first" and "second" are used only for distinguishing descriptions and should not be understood as indicating or implying relative importance. It should be noted that, in the case of no conflict, the features in the embodiments of the present disclosure can be combined with each other.

Existing ultrasound devices generally include an ultrasound head and an ultrasound coupling gel, and the ultrasound generated by the ultrasound head can act on the treatment site through the ultrasound coupling gel in contact with the skin. Ultrasonic coupling gel is generally in a liquid state and is inconvenient to clean. It is also possible to use solid-state ultrasonic coupling gel, which is a large piece of solid-state ultrasonic coupling gel that attaches on the human body, which is inconvenient to fix and high in cost.

In order to solve the above-mentioned technical problems, the present disclosure provides an ultrasonic device, which can generate ultrasound and can be attached to the skin and apply the ultrasound to the treatment site.

Please refer to FIG. 1 and FIG. 2 together, where the ultrasonic device provided by the present disclosure will be described. The ultrasonic device includes a body 10, an ultrasonic head 20, a fixing piece 30, and an ultrasonic coupling gel 40. Wherein, the body 10 can be a holding structure, so as to facilitate holding the ultrasonic device and placing the ultrasonic device on different parts of the human body. In this embodiment, the body 10 is in the shape of a handle. A cavity is provided inside the body 10 for installation of electrical components such as circuit boards and power supplies. It can be understood that in other embodiments, the body 10 can also be another carrier structure for carrying the ultrasonic head 20, the fixing piece 30, and the ultrasonic coupling gel 40, such as the structure of connecting the ultrasonic head 20 with an output line or the structure of connecting the ultrasonic head 20 through wireless. Further, the ultrasonic head 20 protrudes from the body 10. The ultrasound head 20 is capable of generating ultrasound. The fixing piece 30 includes a cover plate 31 and a peripheral wall 32 circumferentially connected with the cover plate 31. The peripheral wall 32 is sleeved on the ultrasonic head 20 to form an accommodation space between the ultrasonic head 20 and the cover plate 31. A through hole 100 is defined on the cover plate 31. The through hole 100 communicates with the accommodation space. The ultrasonic coupling gel 40 is used for ultrasonic transmission. The ultrasonic coupling gel 40 includes a connecting part 41 and a protruding part 42, the connecting part 41 is accommodated in the accommodation space and attached to the ultrasonic head 20 and the cover plate 31 respectively. The ultrasonic head 20 is attached to the connecting part 41 to improve the efficiency of ultrasonic transmission. Further, the protruding part 42 is disposed on the connecting part 41 and can be exposed outside the fixing piece 30 through the through hole 100. The ultrasonic head 20 is protruded from the body 10, so that the protruding part 42 can be more easily attached to the skin to ensure the conduction of the ultrasound. In this embodiment, the ultrasonic coupling gel 40 is made of solid coupling gel. The ultrasonic coupling gel 40 has a certain degree of elasticity, so as to improve the comfort of contact with the skin and avoid scratching the skin. At the same time, the ultrasonic coupling gel 40 has the contact between the ultrasonic head 20 and the skin to reduce acoustic resistance, reduce the reflection loss of ultrasonic energy on the skin, and play a lubricating role. It can be understood that in other embodiments, the ultrasonic coupling gel 40 can be replaced by other solid gels, including but not limited to coupling gels, aqueous polymer gels, acrylic resin gels, or solid gels made of other materials.

To sum up, the implementation of the embodiment of the present disclosure will have the following beneficial effects: the above-mentioned ultrasonic device, in addition to having excellent ultrasonic performance, can also realize the rapid assembly of the ultrasonic coupling gel 40, and avoid the bending of the ultrasonic coupling gel 40 during the assembly process, thereby avoiding the ultrasonic coupling gel 40 from breaking during the subsequent use of the ultrasonic device. Specifically, the ultrasonic device includes an ultrasonic head 20 protruding from the body 10, a fixing piece 30, and an ultrasonic coupling gel 40. Wherein, the fixing piece 30 includes a cover plate 31 and a peripheral wall 32 circumferentially connected with the cover plate 31, and the peripheral wall 32 is sleeved on the ultrasonic head 20, so as to realize the connection between the fixing piece 30 and the ultrasonic head 20, and at the same time form an accommodation space between the ultrasonic head 20 and the cover plate 31. The ultrasonic coupling gel 40 includes a connecting part 41 that is accommodated in the accommodation space and respectively attached to the ultrasonic head 20 and the cover plate 31, so that when the ultrasonic coupling gel 40 is connected to the ultrasonic head 20, bending of the ultrasonic coupling gel 40 can be avoided. By arranging the connecting part 41 between the ultrasonic head 20 and the cover plate 31 to form a close connection between the ultrasonic coupling gel 40 and the ultrasonic head 20, the force on the connecting part 41 will be more uniform, avoiding or reducing stress concentration, and thus reducing the risk of fracture of the ultrasonic coupling gel 40. Further, the cover plate 31 is provided with a through hole 100, and the connecting part 41 is provided with a protruding part 42 that can be exposed outside the fixing piece 30 through the through hole 100, so that the protruding part 42 can contact the skin and reduce the friction between the ultrasonic head 20 and the skin so that the ultrasonic head 20 can slide flexibly and is easy to clean, and the ultrasound generated by the ultrasonic head 20 can act on the treatment site through the ultrasonic coupling gel 40.

In one embodiment, please refer to FIG. 1 to FIG. 5, the ultrasonic head 20 is provided with an annular notch 200 to form a stepped portion on the ultrasonic head 20, and the side of the peripheral wall 32 away from the cover plate 31 is complementary to the annular notch 200. In this way, by making the annular notch 200 complementary, it can ensure that the outer wall of the fixing piece 30 is flush with the outer wall of the ultrasonic head 20, thereby improving the overall appearance of the ultrasonic device. The stepped portion formed at the same time acts as a stopper to limit the movement of the fixing piece 30 to the side of the ultrasonic head 20, thereby reducing the size of the accommodation space and causing the connecting part 41 to be deformed or even crushed.

Figure 2:
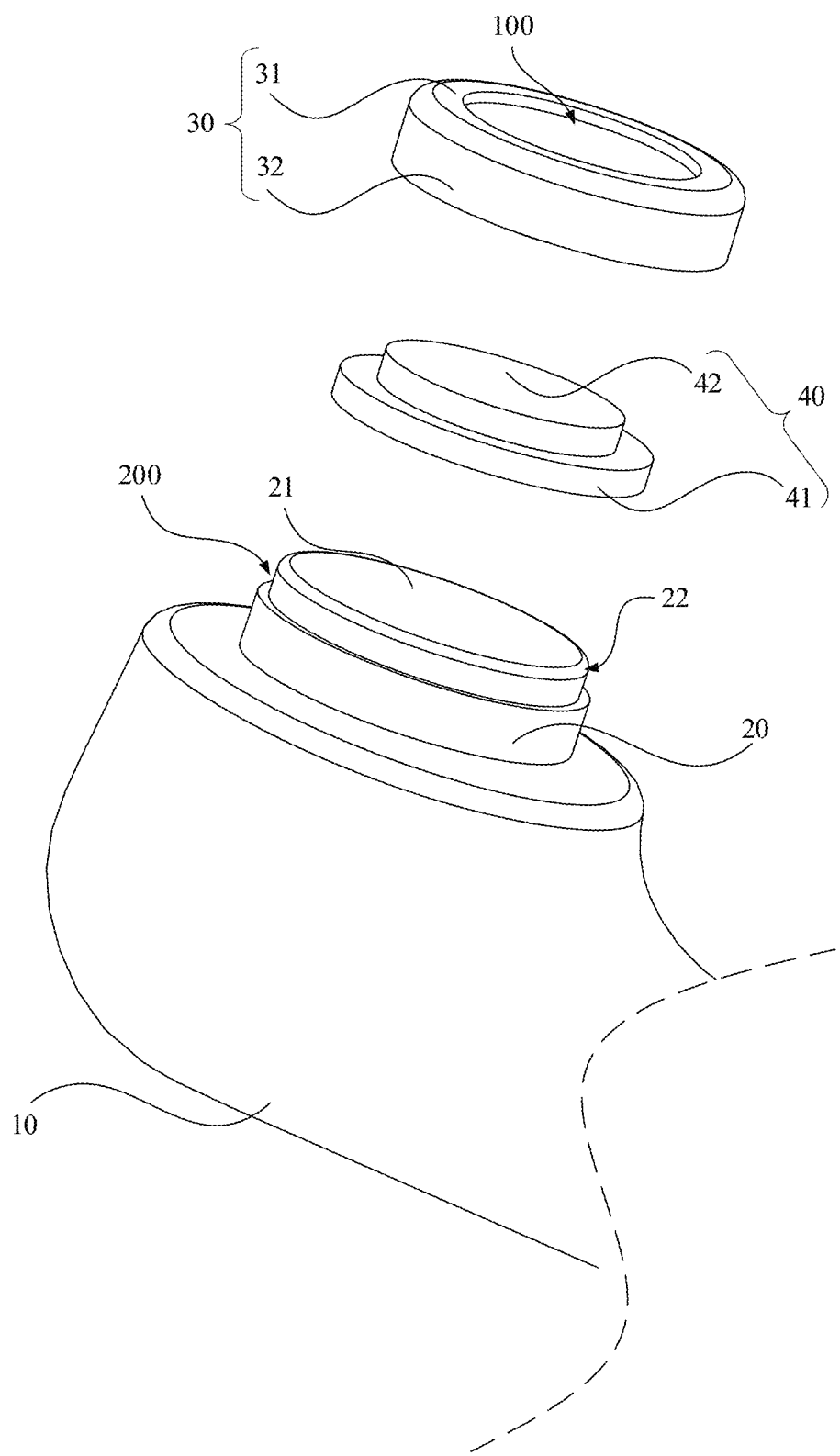
FIG. 2 is an exploded view of FIG. 1.

In one embodiment, please refer to FIG. 1 and FIG. 2 together, the peripheral wall 32 is magnetically connected to the ultrasonic head 20. This can facilitate the fast installation of the fixing piece 30 and the ultrasonic head 20, and realize the relative movement of the fixing piece 30 and the ultrasonic head 20 under the action of magnetic force, so as to automatically move to a preset position. In this embodiment, the peripheral wall 32 and the ultrasonic head 20 can be respectively provided with a plurality of magnetic attractors, and the magnetic attractors are evenly distributed along the circumferential direction of the peripheral wall 32 and the ultrasonic head 20, so as to ensure the force between the fixing piece 30 and the ultrasonic head 20 is uniform. In addition, additional magnetic attractor(s) can be added on the end of the peripheral wall 32 away from the cover plate 31 and on the stepped portion to further improve the connection stability between the fixing piece 30 and the ultrasonic head 20, and at the same time make the end of the peripheral wall 32 away from the cover plate 31 is more closely fitted to the stepped portion, thereby improving the overall appearance. Further, there is a round transition between the peripheral wall 32 and the cover plate 31 to reduce the risk of the ultrasonic device scratching the skin.

Figure 3:
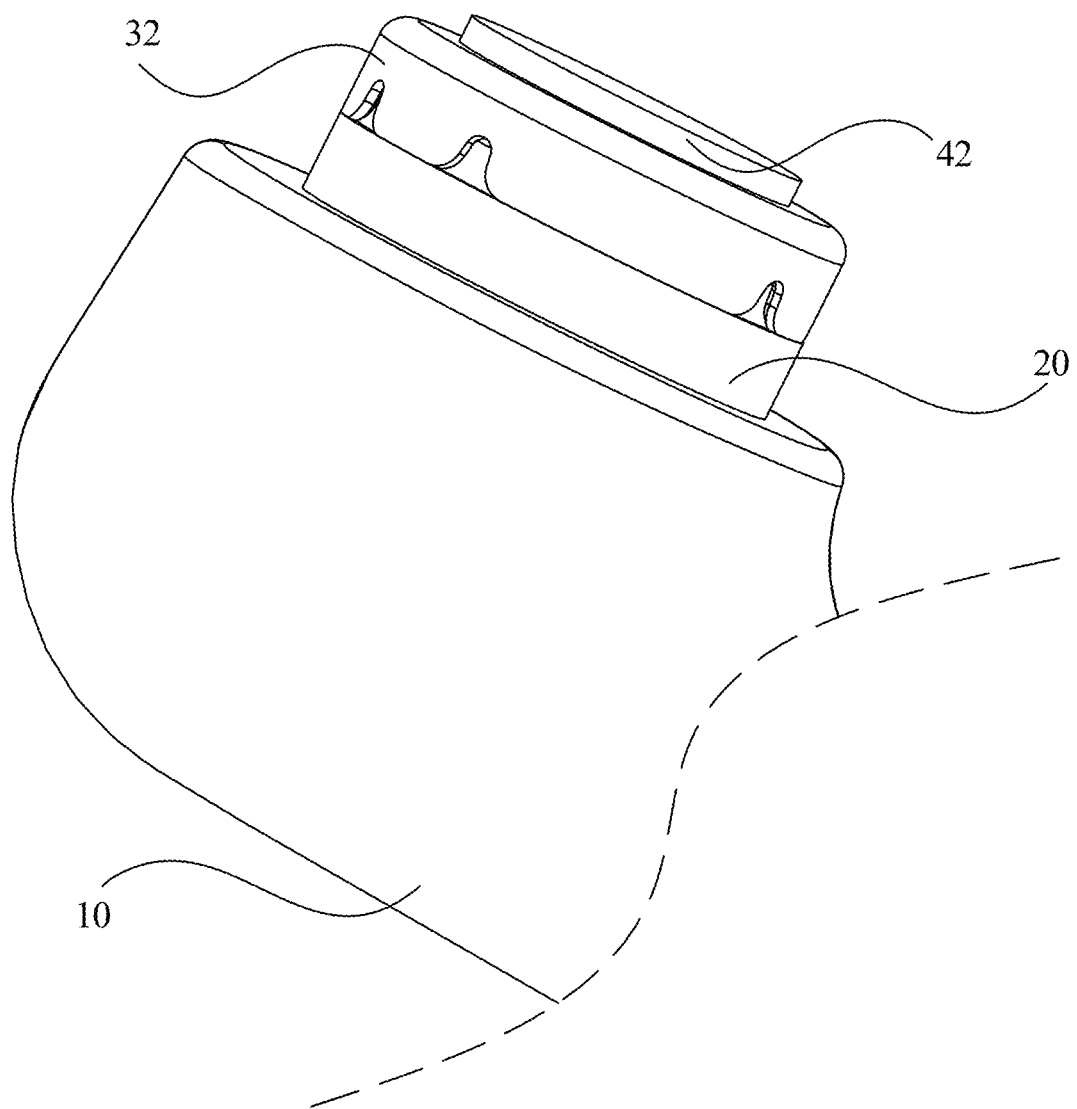
FIG. 3 is a partial schematic diagram of an ultrasonic device in a second embodiment.
Figure 4:
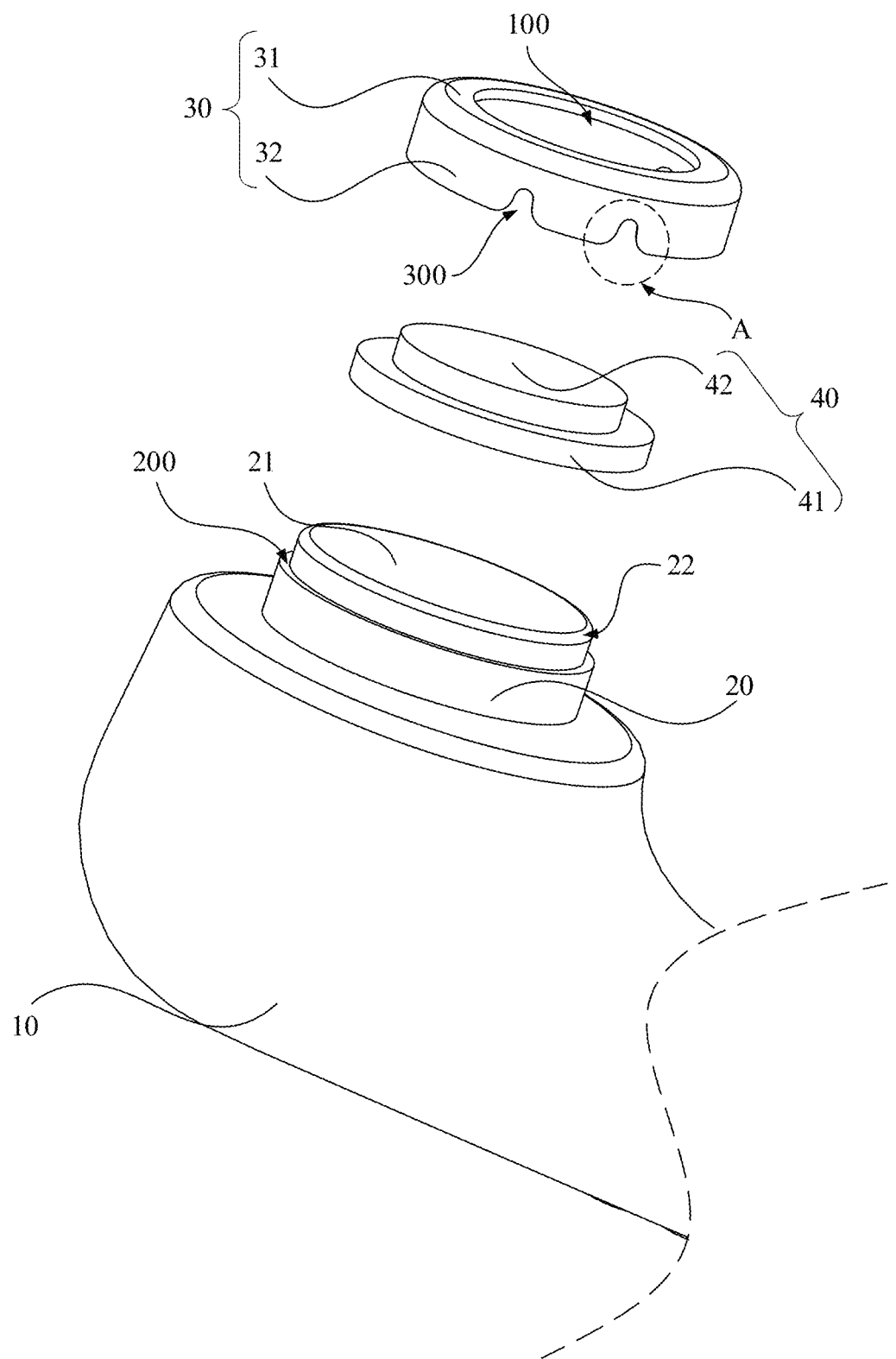
FIG. 4 is an exploded view of FIG. 3.
Figure 5:
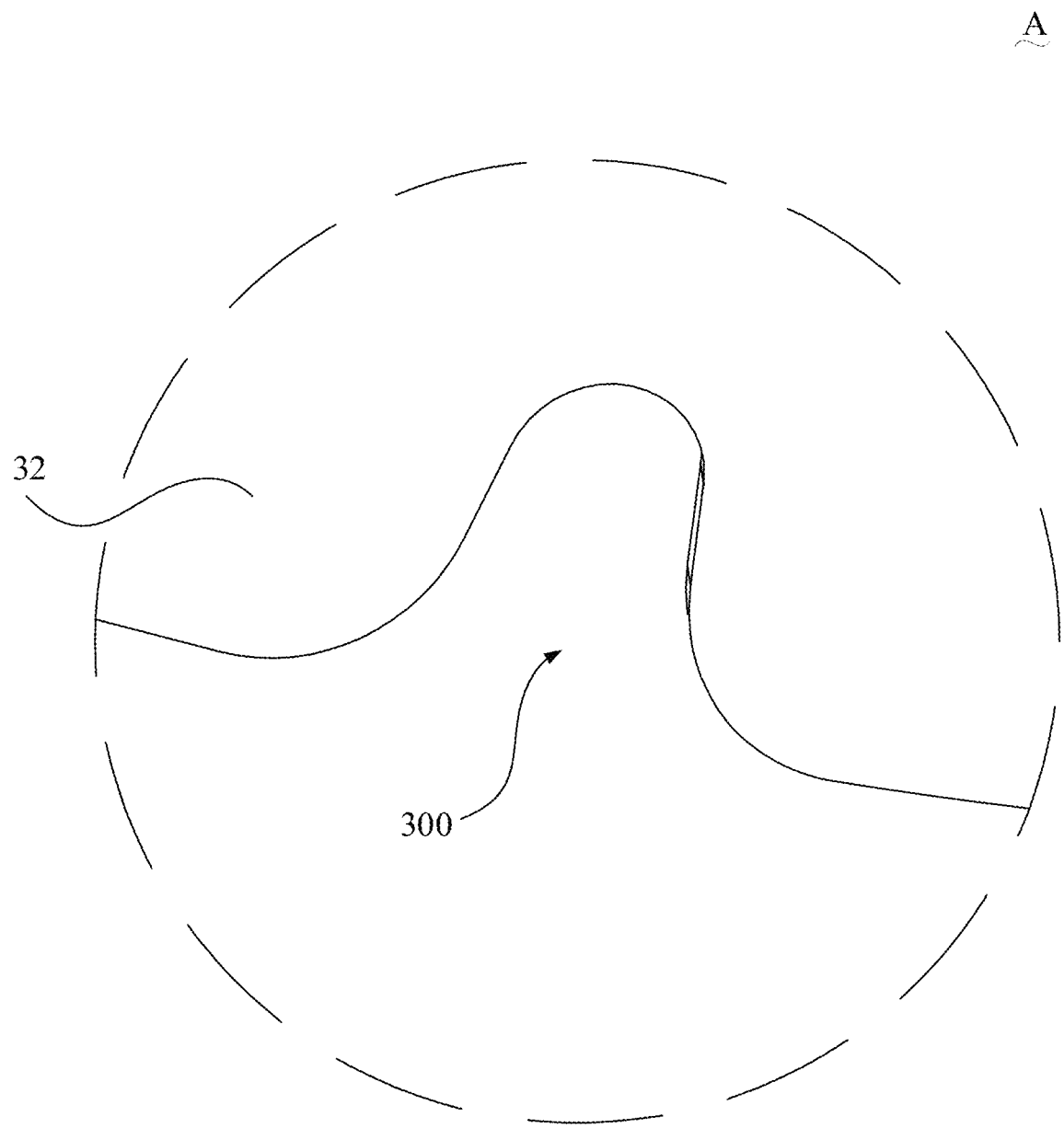
FIG. 5 is a schematic diagram of the enlarged structure of part A in FIG. 4.
Figure 6:
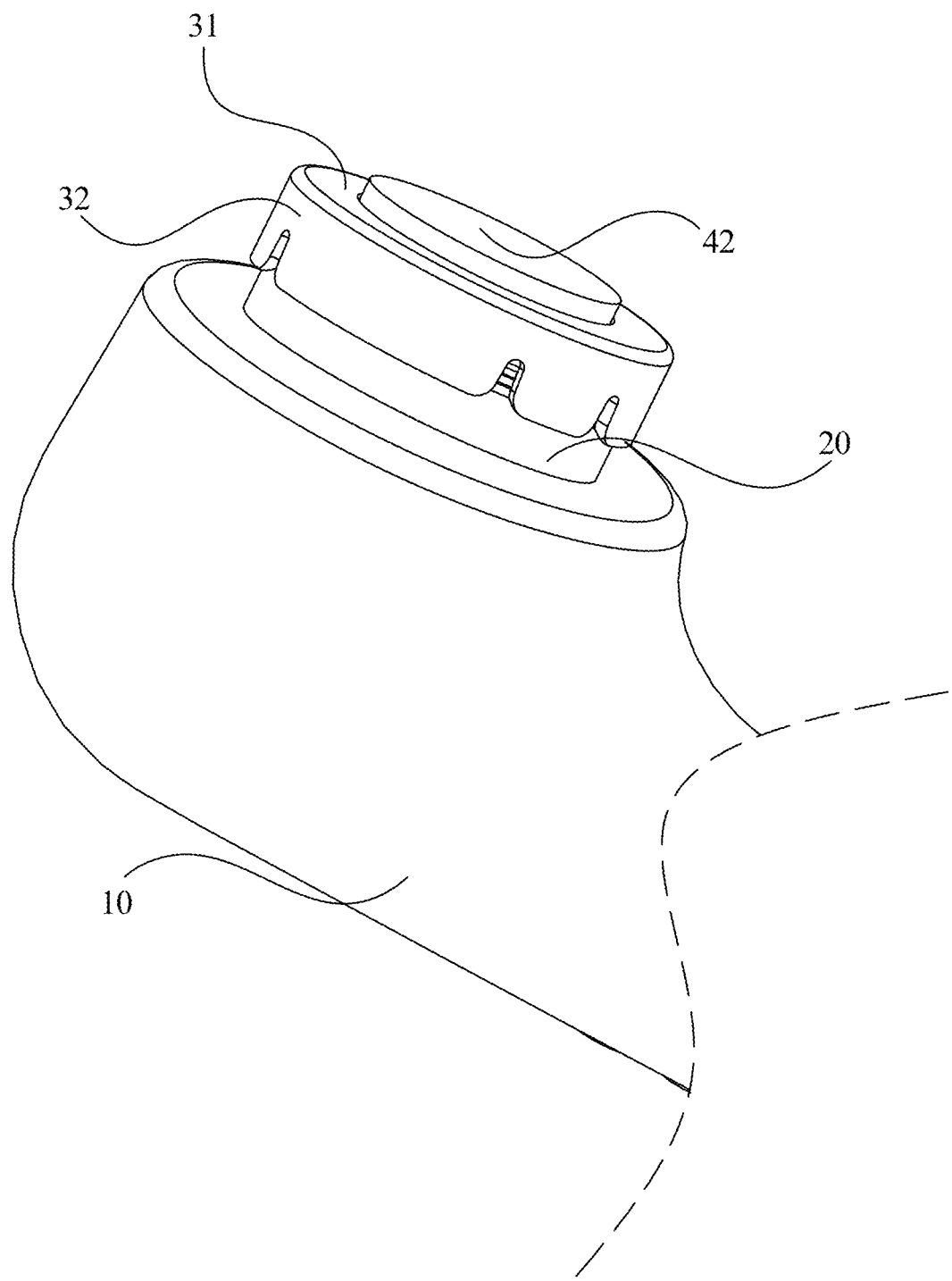
FIG. 6 is a partial schematic diagram of an ultrasonic device in a third embodiment.

In another embodiment, please refer to FIG. 3 to FIG. 5 together, the peripheral wall 32 elastically abuts the ultrasonic head 20. In this way, the socket between the fixing piece 30 and the ultrasonic head 20 is realized through the elastic abutment of the peripheral wall 32. Further, a vacant portion 300 is provided on a side of the peripheral wall 32 away from the cover plate 31, and the vacant portion 300 penetrates through the peripheral wall 32. In this way, the setting of the vacant portion 300 can reduce the rigidity of the peripheral wall 32 and increase the elastic force of the peripheral wall 32 to ensure the stability of the connection between the fixing piece 30 and the ultrasonic head 20. As shown in FIG. 5, further, the end of the vacant portion 300 close to the cover plate 31 is arc-shaped, so as to avoid fracture at the end of the vacant portion 300 close to the cover plate 31 when the peripheral wall 32 is deformed by force. There is a circular arc transition between the two sides of the vacant portion 300 away from the end of the cover plate 31 and the peripheral wall 32. When replacing the ultrasonic coupling gel 40, the above setting can avoid scratching fingers when separating the fixing piece 30 from the ultrasonic head 20. Further, the above setting makes the vacant portion 300 have a small end close to the end of the cover plate 31 and a large end far away from the end of the cover plate 31, so as to facilitate the elastic deformation of the peripheral wall 32. Further, there is a round transition between the peripheral wall 32 and the cover plate 31 to reduce the risk of the ultrasonic device scratching the skin.

In yet another embodiment, please refer to FIG. 6 to FIG. 10 together. The ultrasonic head 20 is provided with a first clamping part 400, and the peripheral wall 32 is provided with a second clamping part 321. The second clamping part 321 can be connected to the first clamping part 400, so that the peripheral wall 32 is sleeved on the ultrasonic head 20. In this way, the arrangement of the second clamping part 321 and the first clamping part 400 can increase the connection area between the fixing piece 30 and the ultrasonic head 20, thereby increasing the connection stability between the fixing piece 30 and the ultrasonic head 20. At the same time, the setting of the second clamping part 321 and the first clamping part 400 can restrict the fixing piece 30 from continuing to move toward the side of the ultrasonic head 20, and act as a stopper to limit the fixing piece 30 from continuing to move toward the side of the ultrasonic head 20, and then reduce the size of the accommodation space, causing the connecting part 41 to be squeezed, deformed, or even crushed. In this embodiment, the first clamping part 400 is a groove structure. The second clamping part 321 is a protruding structure. It can be understood that in other embodiments, the first clamping part 400 is a protruding structure, and the second clamping part 321 is a groove structure.

Figure 7:
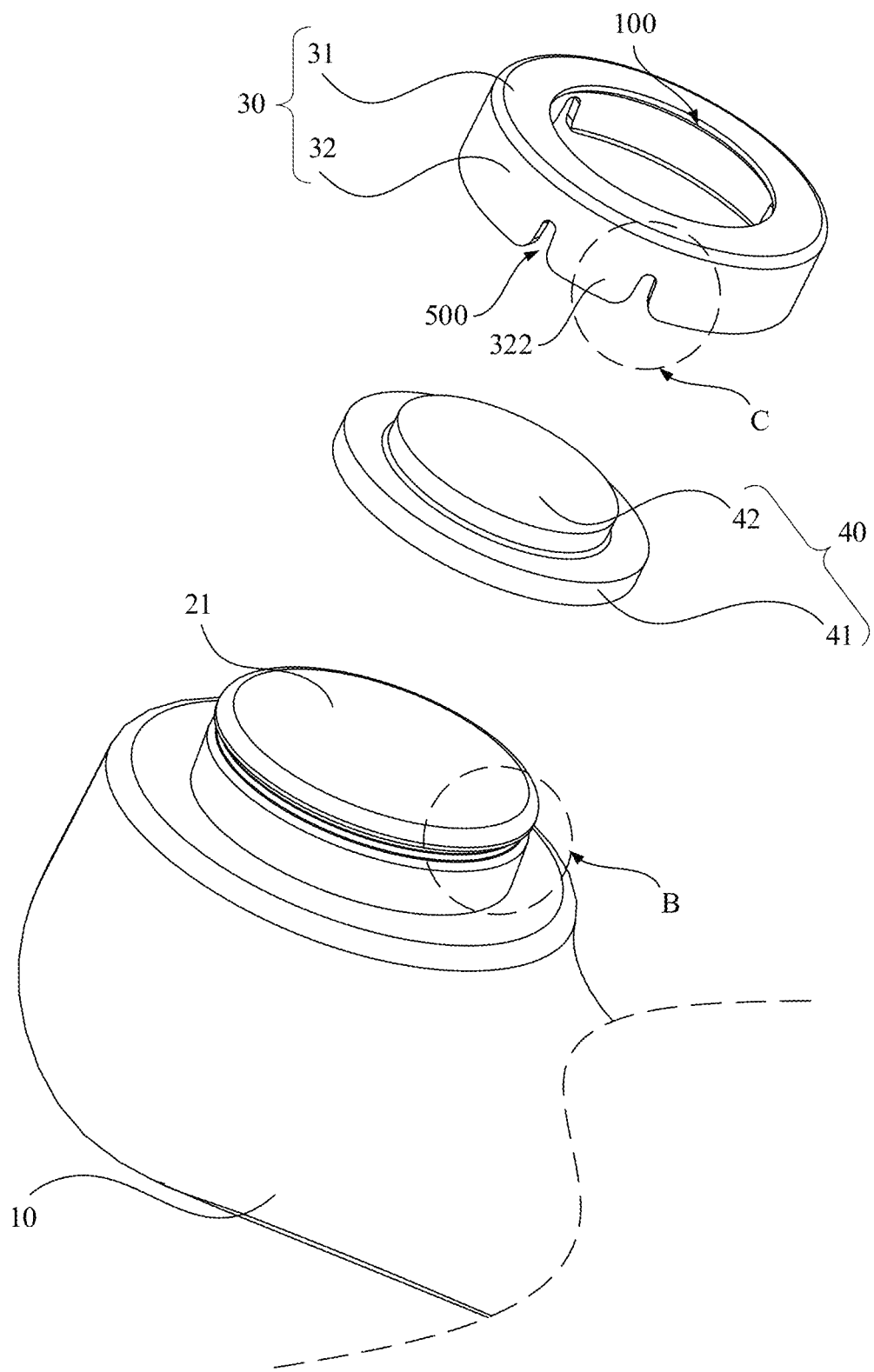
FIG. 7 is an exploded view of FIG. 6.
Figure 8:
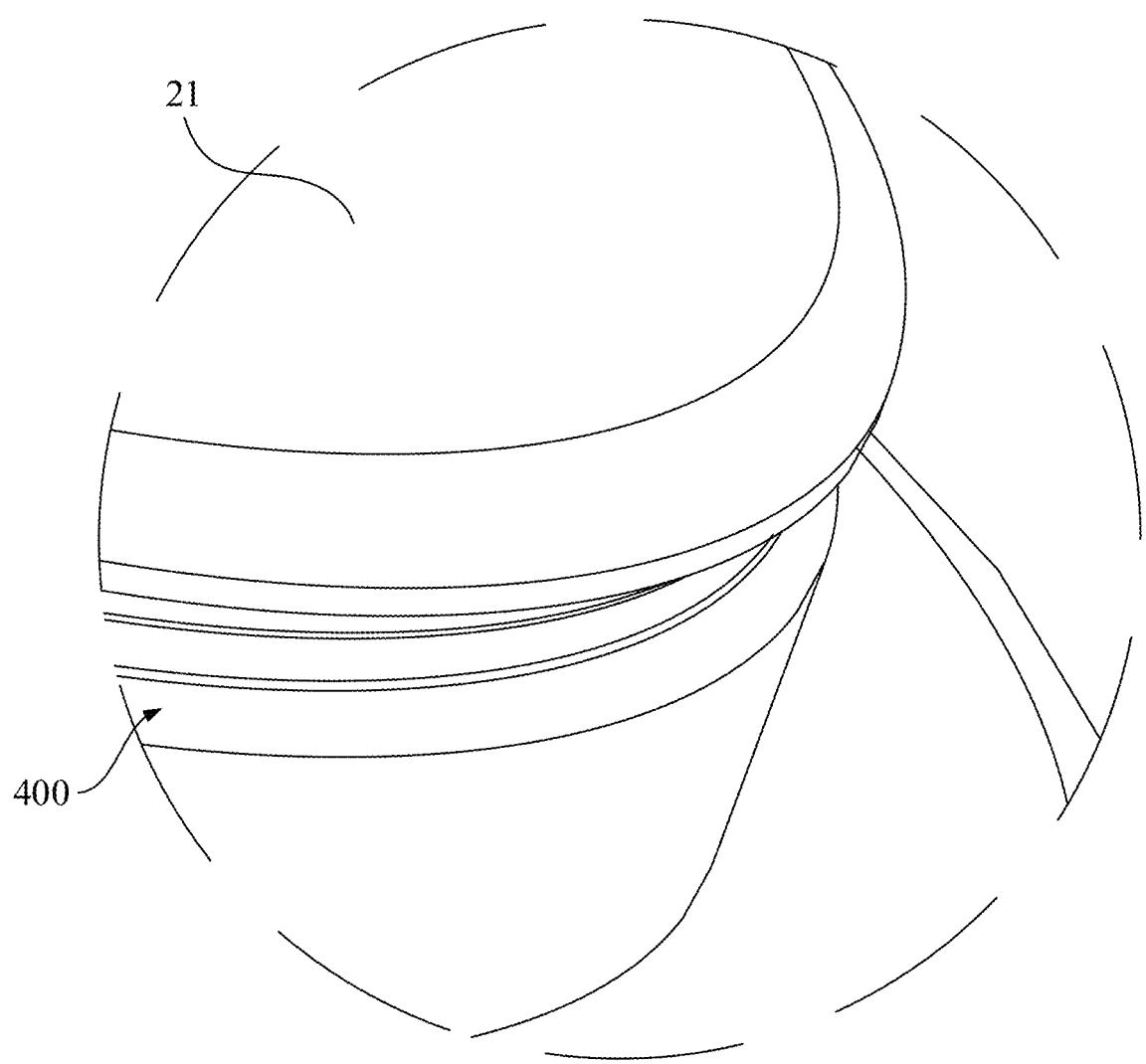
FIG. 8 is a schematic diagram of the enlarged structure of part B in FIG. 7.
Figure 9:
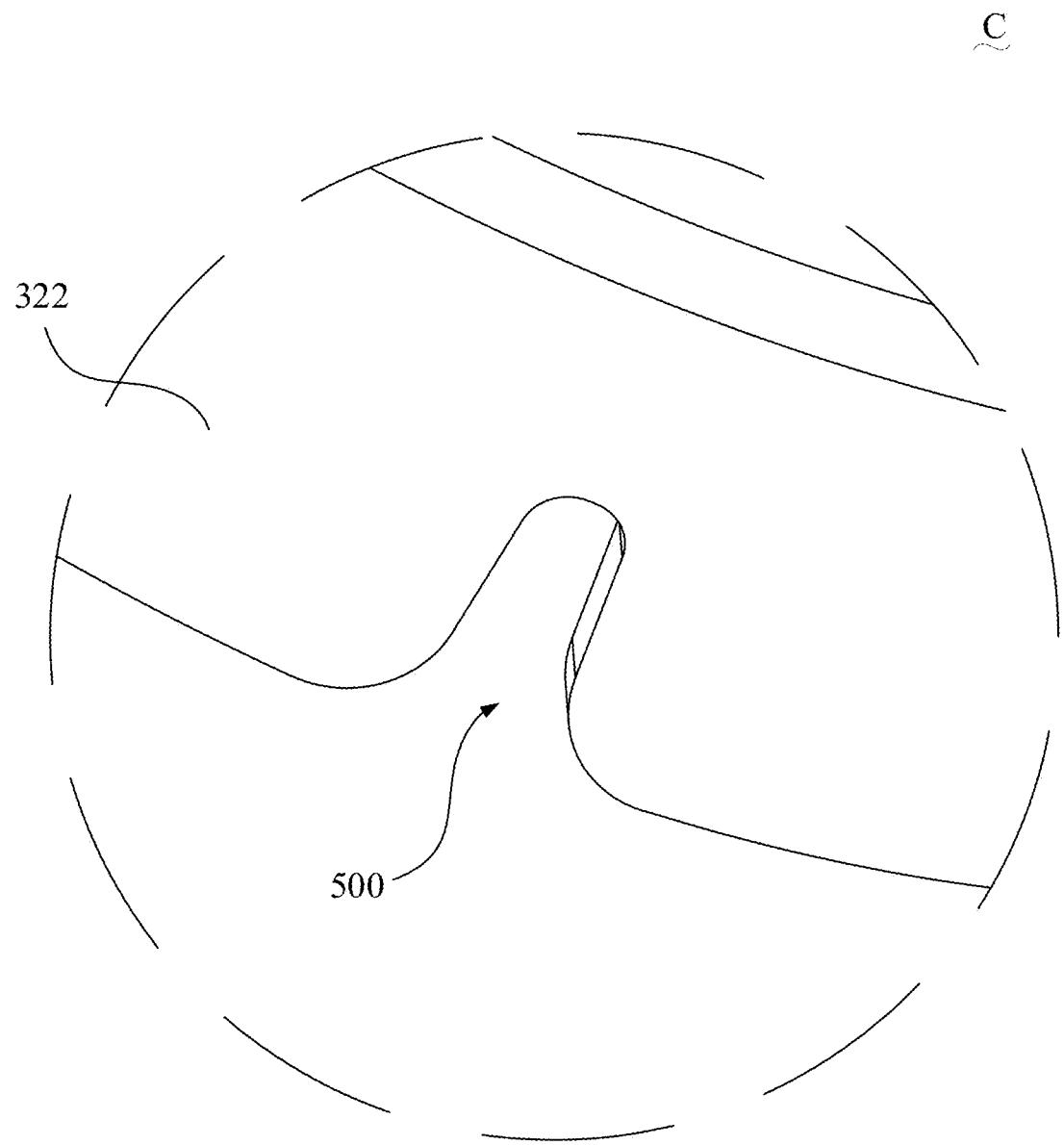
FIG. 9 is a schematic diagram of the enlarged structure of part C in FIG. 7.
Figure 10:
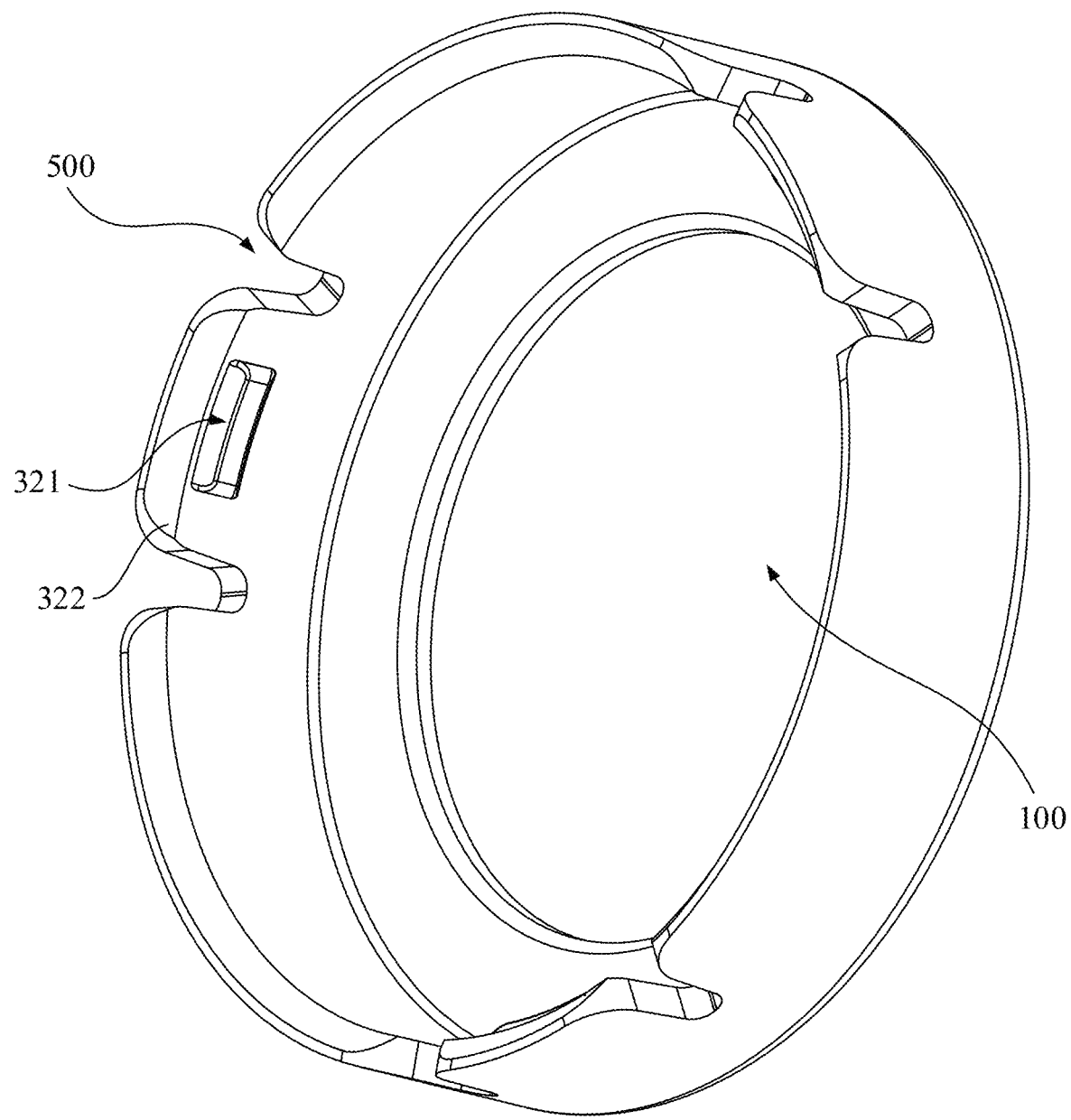
FIG. 10 is a schematic diagram of the fixing piece in the ultrasonic device shown in FIG. 6.

Further, please refer to FIG. 6 to FIG. 10 together, the side of the peripheral wall 32 away from the cover plate 31 is provided with a plurality of through grooves 500, and the through grooves 500 run through the peripheral wall 32 to form elastic arm 322, and the second clamping part 321 are disposed on the elastic arm 322. In this way, through the arrangement of the through grooves 500, the elastic arm 322 with certain elasticity can be formed on the peripheral wall 32, and the connection stability between the second clamping part 321 and the ultrasonic head 20 can be improved. As shown in FIG. 9, further, the end of the through grooves 500 close to the cover plate 31 is arc-shaped, so as to avoid fracture at the end of the through groove 500 close to the cover plate 31 when the peripheral wall 32 is deformed by force. There is a circular arc transition between the two sides of the through groove 500 away from the end of the cover plate 31 and the peripheral wall 32. When replacing the ultrasonic coupling gel 40, the above setting can avoid scratching fingers when separating the fixing piece 30 from the ultrasonic head 20 Furthermore, the above arrangement makes the through grooves 500 have a small end close to the end of the cover plate 31 and a large end far away from the end of the cover plate 31, so as to facilitate the elastic deformation of the elastic arm 322. Further, there is a round transition between the peripheral wall 32 and the cover plate 31 to reduce the risk of the ultrasonic device scratching the skin.

Further, please refer to FIG. 7 and FIG. 9 together, the first clamping part 400 is an annular structure, which can reduce the assembly accuracy between the fixing piece 30 and the ultrasonic head 20 and improve the assembly efficiency. In this embodiment, the first clamping part 400 is an annular groove, and the second clamping part 321 is a protruding structure. It can be understood that in other embodiments, the first clamping part 400 is an annular protrusion, and the second clamping part 321 is a groove structure.

On the basis of the above-mentioned embodiment, the protruding part 42 is attached to the inner wall of the through hole 100 on the cover plate, so that the circumferential direction of the protruding part 42 can be attached to the cover plate 31, and the rigidity of the protruding part 42 is improved to avoid or reduce the risk of breakage at the junction of the connecting part 41 and the protruding part 42.

In some embodiments, please refer to FIG. 2, FIG. 4, and FIG. 7, the ultrasonic head 20 includes a first surface 21, and the connecting part 41 is attached to the first surface 21 to ensure the conduction of ultrasound. In this embodiment, the first surface 21 is a plane surface. It can be understood that in other embodiments, the first plane may also be a curved surface.

In some embodiments, please refer to FIG. 2, FIG. 4, FIG. 7, and FIG. 8, the first surface 21 is provided with rounded corners 22 bent toward the body 10 in the circumferential direction. In FIG. 2 and FIG. 4, the rounded corners 22 can guide and cooperate with the peripheral wall 32 to realize the rapid assembly of the fixing piece 30 and the ultrasonic head 20. In FIG. 7 and FIG. 8, the rounded corners 22 can guide and cooperate with the second clamping part 321 in a protruding structure to realize quick assembly of the fixing piece 30 and the ultrasonic head 20.

Figure 11:
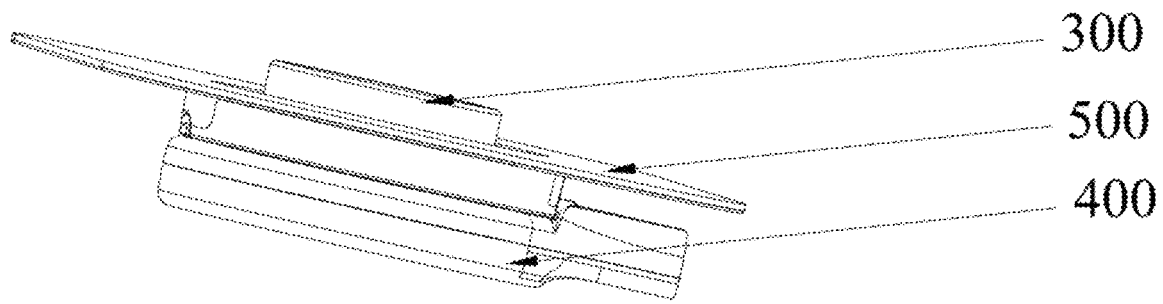
FIG. 11 is a partial schematic view of the ultrasonic device in the fourth embodiment.
Figure 12:
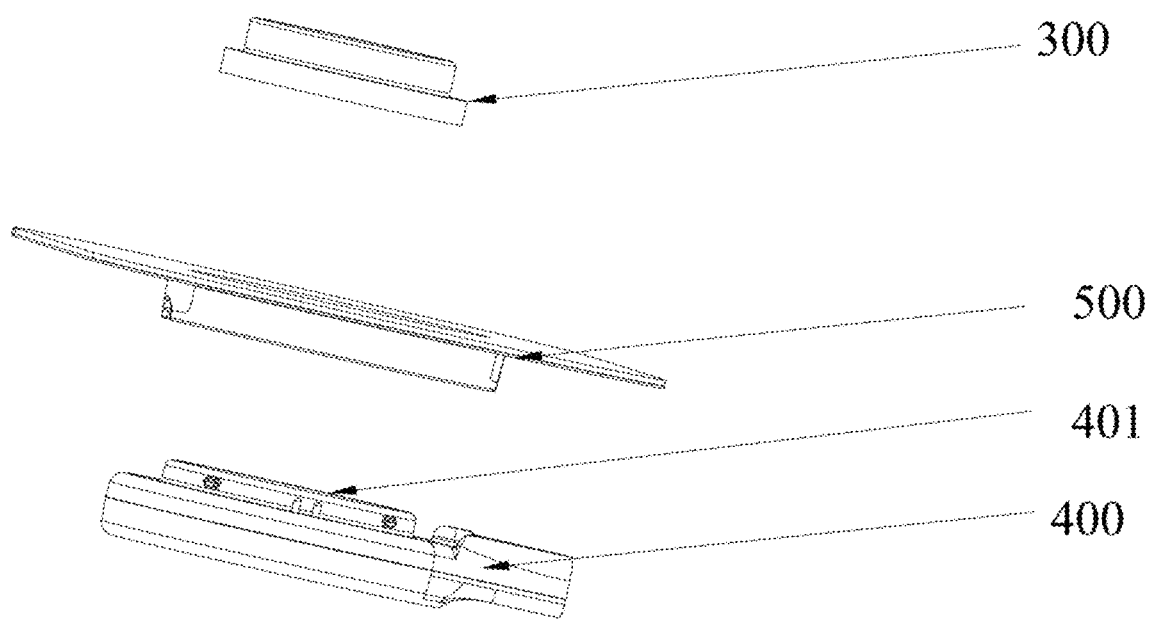
FIG. 12 is an exploded view an exploded view of FIG. 11.

In the fourth embodiment, please refer to FIG. 11 and FIG. 12 to describe the ultrasonic device provided by the present disclosure. The ultrasonic device includes an ultrasonic coupling gel 300, an ultrasonic head 400, an ultrasonic head output part 401, and an ultrasonic fixing sticker 500. Wherein, the ultrasonic head 400 can be connected to the body through an output line, and the ultrasonic fixing sticker 500 can be attached to different portions of the human body. In this embodiment, a cavity is provided inside the ultrasonic head 400 for installation of electrical components such as circuit boards and power supplies. In other embodiments, the ultrasonic head 400 can also be other carrier structures (such as a handheld or a wireless connection structure) for carrying the ultrasonic fixing sticker 500 and the ultrasonic coupling gel 300. Further, the ultrasonic head output part 401 protruded from the ultrasonic head 400. The ultrasound head output part 401 is capable of generating ultrasound. There is a through hole on the ultrasonic fixing sticker 500. One side of the ultrasonic coupling gel 300 is attached to the ultrasonic head 400, and the other side acts on the treatment site of the human body through the through hole of the ultrasonic fixing sticker 500 to ensure the conduction of ultrasound. In this embodiment, the ultrasonic coupling gel 300 is made of solid coupling gel. The ultrasonic coupling gel 300 has a certain degree of elasticity to improve the comfort of contact with the skin and avoid scratching it. At the same time, the ultrasonic coupling gel 300 can make the ultrasonic head 400 contact with the skin to reduce acoustic resistance, reduce the reflection loss of ultrasonic energy on the skin, and play a lubricating role. It can be understood that in other embodiments, the ultrasonic coupling gel 300 can be replaced by other solid gels, including but not limited to coupling gels, aqueous polymer gels, acrylic resin gels, or solid gels made of other materials.

Figure 13:
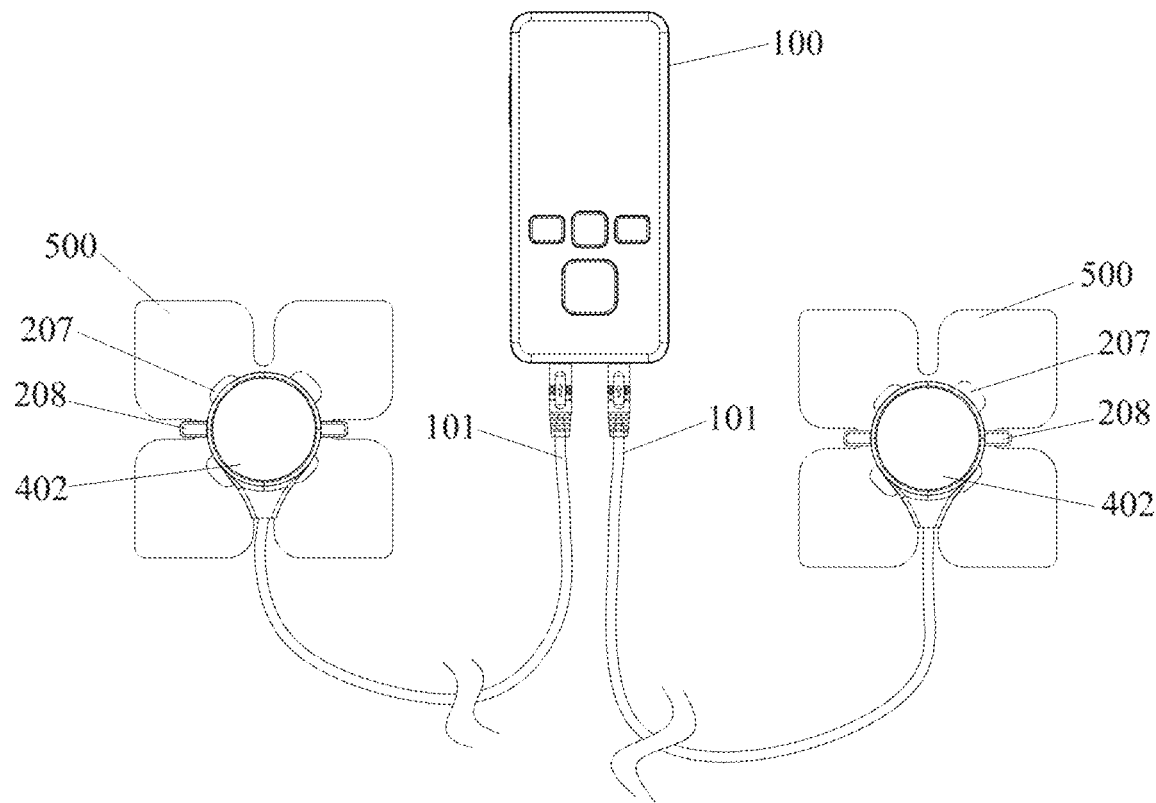
FIG. 13 is a schematic diagram of the ultrasonic device in the fifth embodiment.
Figure 14:
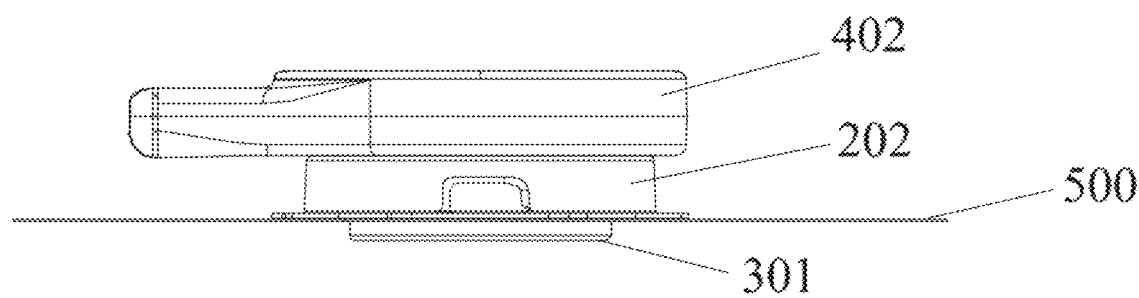
FIG. 14 is a partial schematic view of the ultrasonic device in FIG. 13.
Figure 18:
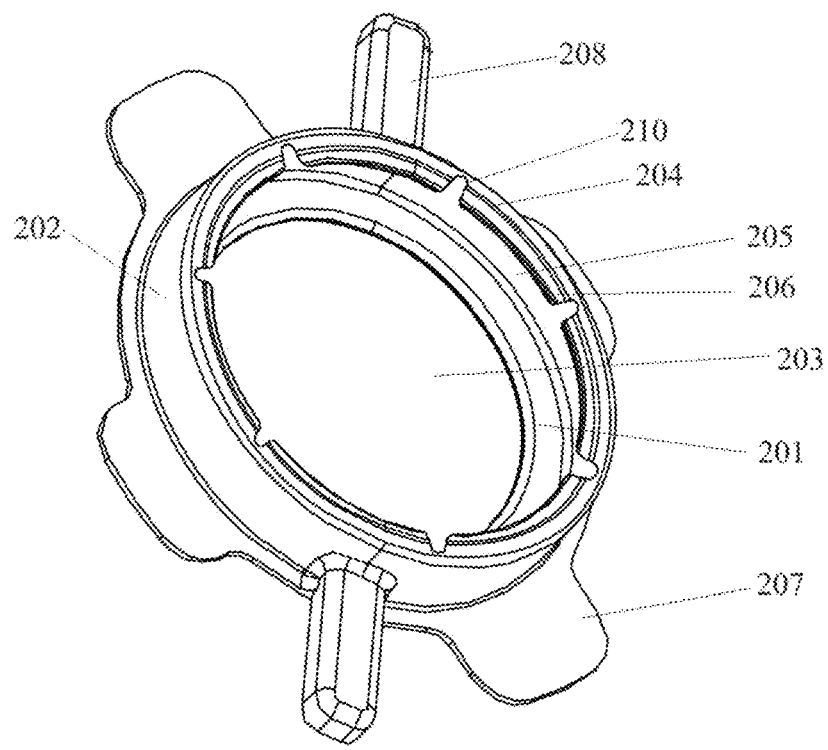
FIG. 18 is a schematic diagram of the fixing piece of the ultrasound device in the fifth embodiment.

In the fifth embodiment, referring to FIG. 13 and FIG. 18, an ultrasonic device is provided by the present disclosure. The ultrasound device, comprising: a body 100; an ultrasonic head 400, which can be connected to the body 100 through a lead wire 101 or wirelessly and is configured to generate ultrasound; and a fixing piece 200, which comprises a cover plate 201 and a peripheral wall 202 circumferentially and vertically connected with the cover plate 201; the peripheral wall 202 is sleeved on the ultrasonic head 400 to form an accommodation space between the ultrasonic head 400 and the cover plate 201; a first through hole 203 is provided on the cover plate 201, and the first through hole 203 communicates with the accommodation space; and an ultrasonic coupling gel 300, which is used for ultrasound to pass through; the ultrasonic coupling gel 300 comprises a first connecting part 302 and a protruding part 301; the first connecting part 302 is accommodated in the accommodation space and directly attached to the ultrasonic head 400 and the cover plate 201 respectively and simultaneously; the protruding part 301 is arranged on the first connecting part 302 and is exposed outside the fixing piece 200 through the first through hole 203. In this embodiment, the ultrasonic coupling gel 300 is made of solid coupling gel. The ultrasonic coupling gel 300 has a certain degree of elasticity, so as to improve the comfort of contact with the skin and avoid scratching the skin. At the same time, the ultrasonic coupling gel 300 has the contact between the ultrasonic head 400 and the skin to reduce acoustic resistance, reduce the reflection loss of ultrasonic energy on the skin, and play a lubricating role. It can be understood that in other embodiments, the ultrasonic coupling gel 300 can be replaced by other solid gels, including but not limited to coupling gels, aqueous polymer gels, acrylic resin gels, or solid gels made of other materials.

In some embodiments, the ultrasonic head 400 comprises a first clamping part 403, and the first clamping part 403 comprises one or more first protruding structures; the peripheral wall 202 that is not on the side of the cover plate 201 comprises a second clamping part 204, and the second clamping part 204 is around the peripheral wall 202 of the circumferential protruding structure, so that the peripheral wall 202 inside the formation of an annular groove 205; the first clamping part 403 protruded into the annular groove 205 of the second clamping part 204, and the peripheral wall 202 is configured to be sleeved on the ultrasonic head 400;

and the circumferential direction of the circumferential protruding structure comprising corners 206 bending toward the inner part of the peripheral wall 202, and the corners 206 guide and cooperate with the first clamping part 403 in the first protruding structure to accelerate assemblance of the fixing piece 200 and the ultrasonic head 400.

To sum up, the implementation of the embodiment of the present disclosure will have the following beneficial effects: the above-mentioned ultrasonic device, in addition to having excellent ultrasonic performance, can also realize the rapid assembly of the ultrasonic coupling gel 300, and avoid the bending of the ultrasonic coupling gel 300 during the assembly process, thereby avoiding the ultrasonic coupling gel 300 from breaking during the subsequent use of the ultrasonic device. Specifically, the ultrasonic device includes an ultrasonic head 400 connected to the body 100 through a lead wire 101 or wirelessly, a fixing piece 200, and an ultrasonic coupling gel 300. Wherein, the fixing piece 200 includes a cover plate 201 and a peripheral wall 202 circumferentially connected with the cover plate 201, and the peripheral wall 202 is sleeved on the ultrasonic head 400, so as to realize the connection between the fixing piece 200 and the ultrasonic head 400, and at the same time form an accommodation space between the ultrasonic head 400 and the cover plate 201. The ultrasonic coupling gel 300 includes a first connecting part 302 that is accommodated in the accommodation space and respectively attached to the ultrasonic head 400 and the cover plate 201, so that when the ultrasonic coupling gel 300 is connected to the ultrasonic head 400, bending of the ultrasonic coupling gel 300 can be avoided. By arranging the first connecting part 302 between the ultrasonic head 400 and the cover plate 201 to form a close connection between the ultrasonic coupling gel 300 and the ultrasonic head 400, the force on the first connecting part 302 will be more uniform, avoiding or reducing stress concentration, and thus reducing the risk of fracture of the ultrasonic coupling gel 300. Further, the cover plate 201 is provided with a first through hole 203, and the first connecting part 302 is provided with a protruding part 301 that can be exposed outside the fixing piece 200 through the first through hole 203, so that the protruding part 301 can contact the skin and reduce the friction between the ultrasonic head 400 and the skin so that the ultrasonic head 400 can slide flexibly and is easy to clean, and the ultrasound generated by the ultrasonic head 400 can act on the treatment site through the ultrasonic coupling gel 300.

In some embodiments, the ultrasonic head comprises a second connecting part and an ultrasonic head output part; the ultrasonic head output part protrudes from the second connecting part, and the first clamping part is arranged on the ultrasonic head output part; the second connecting part is in contact with the circumferential protruding structure or the one or more second protruding structures to limit the ultrasonic head to move toward a side of the fixing piece, and to prevent the ultrasonic coupling gel from being squeezed, deformed, or crushed.

In some embodiments, the first clamping part comprises a plurality of the one or more first protruding structures, and the plurality of the one or more first protruding structures are evenly distributed.

In some embodiments, the ultrasonic device further comprises an ultrasonic fixing sticker fixed at the bottom of the fixing piece and a second through hole provided on the ultrasonic fixing sticker, where the protruding part is exposed outside the ultrasonic fixing sticker through the second through hole.

In some embodiments, an external side of the fixing piece is provided with a fixation part, the fixation part being connected with the ultrasonic fixing sticker.

In some embodiments, an external side of the fixing piece is provided with a hand part, so as to facilitate the user to take the fixing piece.

In some embodiments, the ultrasonic coupling gel comprises water-based polymer gel or acrylic resin gel.

In some embodiments, the protruding part is attached an inner wall of the first through hole on the cover plate.

In some embodiments the gap between the one or more second protruding structures is less than the width of the first protruding structure.

In some embodiments, the body is configured to be connected to one or more ultrasonic heads.

In some embodiments, the circumferential protruding structure comprises one or more vacant portions, the one or more vacant portions are arranged on a side of the circumferential protruding structure that is away from the peripheral wall; and the one or more vacant portions penetrate partially in a vertical direction of the peripheral wall through the circumferential protruding structure to facilitate replacement of the ultrasonic coupling gel.

In some embodiments, each of the one or more vacant portions comprises a small end close to an end of the peripheral wall and a large end far away from the end of the peripheral wall, so as to facilitate elastic deformation of the circumferential protruding structure; wherein the small end is arc-shaped, so as to avoid fracture and further facilitate the elastic deformation of the circumferential protruding structure; and wherein a circular arc-transition is disposed between two sides of the each of the one or more vacant portions away from the end of the peripheral wall and the circumferential protruding structure, so as to further facilitate the replacement of the ultrasonic coupling gel and to avoid scratching body parts.

In some embodiments, the peripheral wall comprises a first plurality of magnetic attractors evenly distributed along a circumferential direction of the peripheral wall, the ultrasonic head comprises a second plurality of magnetic attractors evenly distributed along the circumferential direction of the ultrasonic head, the first plurality of magnetic attractors and the second plurality of magnetic attractors cooperate to ensure a uniform force between the fixing piece and the ultrasonic head; wherein the first plurality of magnetic attractors are arranged on a surface of the peripheral wall other than a horizontal end surface of the peripheral wall, and the second plurality of magnetic attractors are arranged on a surface of the ultrasonic head other than a horizontal end surface of the ultrasonic head.

In some embodiments, referring to FIG. 14 to FIG. 17, the ultrasonic head 400 comprises a second connecting part 402 and an ultrasonic head output part 401; the ultrasonic head 400 is connected to the body 100 through a lead wire 101 or wirelessly; the ultrasonic head output part 401 protrudes from the second connecting part 402, and the first clamping part 403 is arranged on the ultrasonic head output part 401; the second connecting part 402 is in contact with the circumferential protruding structure to limit the ultrasonic head 400 to move toward a side of the fixing piece 200, and to prevent the ultrasonic coupling gel 300 from being squeezed, deformed, or crushed. The second connecting part 402 acts as a stopper to limit the movement of the fixing piece 200 to the side of the ultrasonic head 400, thereby reducing the size of the accommodation space and causing the second connecting part 402 to be deformed or even crushed.

Figure 17:
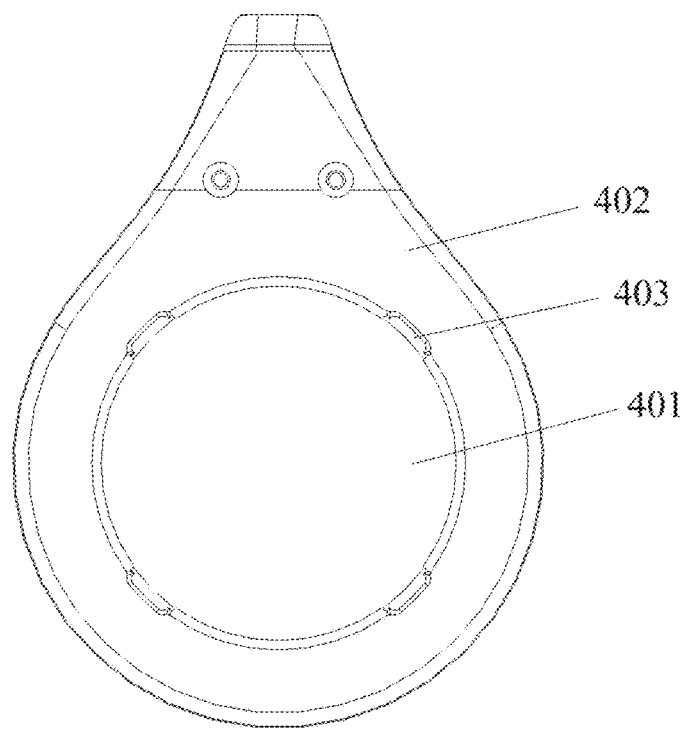
FIG. 17 is a schematic diagram of the ultrasonic head in the ultrasonic device shown in FIG. 14.

In some embodiments, referring to FIG. 17, the first clamping part 403 comprises a plurality of the first protruding structures, and the plurality of the first protruding structures are evenly distributed, the plurality of the first protruding structures and the second clamping part 204 are clamped so that the peripheral wall 202 is more firmly set on the ultrasonic head 400.

Figure 15:
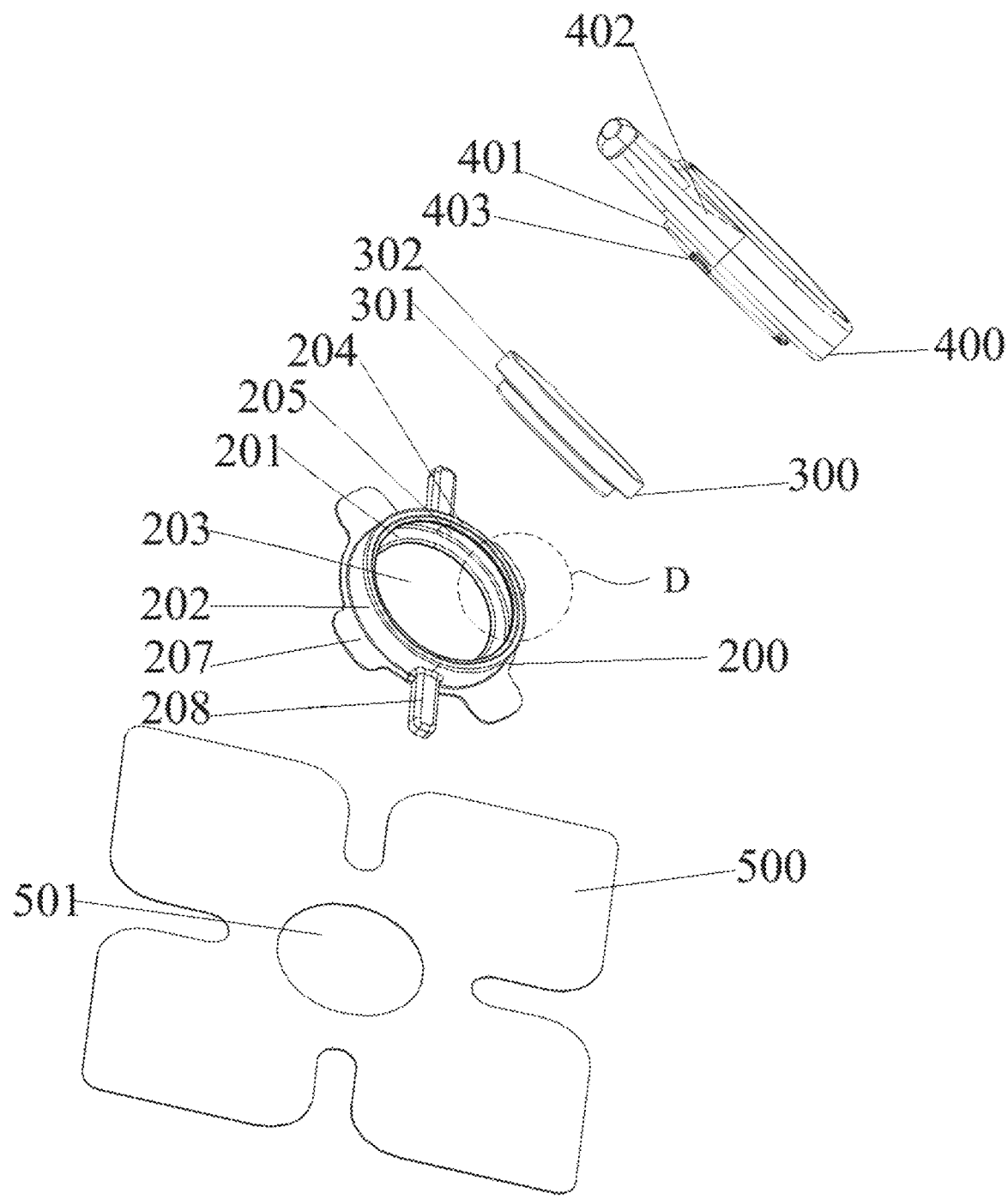
FIG. 15 is an exploded view of FIG. 14.

In some embodiments, referring to FIG. 15, and FIG. 18, further comprises an ultrasonic fixing sticker 500 fixed at the bottom of the fixing piece 200, a second through hole 501 is provided on the ultrasonic fixing sticker 500, the protruding part 301 is exposed outside the ultrasonic fixing sticker 500 through the second through hole 501; the ultrasonic fixing sticker 500 is pasted on the body 100 to be treated, so that the ultrasonic head 400 and the ultrasonic coupling gel 300 are fixed on the body 100 to be treated.

In some embodiments, referring to FIG. 15, and FIG. 18, the external side of the fixing piece 200 is provided with a fixation part 207, which is connected with the ultrasonic fixing sticker 500, so that the ultrasonic fixing sticker 500 and the fixing piece 200 are fixed more firmly.

In some embodiments, referring to FIG. 15, and FIG. 18, the external side of the fixing piece 200 is provided with a hand part 208, so as to facilitate the user to take the fixing piece 200.

In some embodiments, the ultrasonic coupling gel 300 comprises water-based polymer gel or acrylic resin gel.

In some embodiments, the protruding part 301 is attached to inner wall of the first through hole 203 on the cover plate 201, so that the circumferential direction of the protruding part 301 can be attached to the cover plate 201, and the rigidity of the protruding part 301 is improved to avoid or reduce the risk of breakage at the junction of the first connecting part 302 and the protruding part 301.

In some embodiments, referring to FIG. 13, the body 100 can be connected to one or more ultrasonic heads 400.

In some embodiments, referring to FIG. 18, the circumferential protruding structure comprises one or more vacant portions 210, the one or more vacant portions 210 are arranged on a side of the circumferential protruding structure that is away from the peripheral wall 202; and the one or more vacant portions 210 penetrate partially in a vertical direction of the peripheral wall 202 through the circumferential protruding structure to facilitate replacement of the ultrasonic coupling gel 300. In this way, the socket between the fixing piece 200 and the ultrasonic head 400 is realized through the elastic abutment of the circumferential protruding structure.

In some embodiments, referring to FIG. 18, each of the one or more vacant portions 210 comprises a small end close to the end of the peripheral wall 202 and a large end far away from the end of the peripheral wall 202, so as to facilitate elastic deformation of the circumferential protruding structure; wherein the small end is arc-shaped, so as to avoid fracture and further facilitate the elastic deformation of the circumferential protruding structure; and wherein a circular arc-transition is disposed between two sides of the each of the one or more vacant portions 210 away from an end of the peripheral wall 202 and the circumferential protruding structure, so as to further facilitate the replacement of the ultrasonic coupling gel 300 and to avoid scratching body parts.

Figure 16:
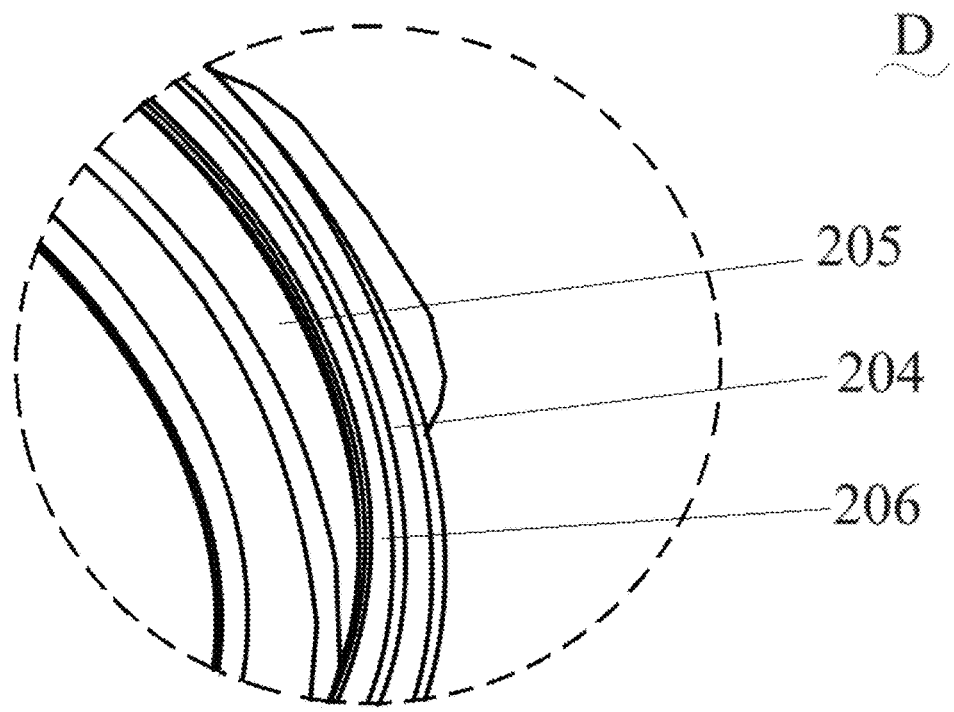
FIG. 16 is a schematic diagram of the enlarged structure of part D in FIG. 15.

In some embodiments, referring to FIG. 15 to FIG. 17 together, the peripheral wall 202 comprises a first plurality of magnetic attractors evenly distributed along a circumferential direction of the peripheral wall 202, the ultrasonic head 400 comprises a second plurality of magnetic attractors evenly distributed along the circumferential direction of the ultrasonic head 400, the first plurality of magnetic attractors and the second plurality of magnetic attractors cooperate to ensure a uniform force between the fixing piece 200 and the ultrasonic head 400; wherein the first plurality of magnetic attractors are arranged on a surface of the peripheral wall 202 other than a horizontal end surface of the peripheral wall 202, and the second plurality of magnetic attractors are arranged on a surface of the ultrasonic head 400 other than a horizontal end surface of the ultrasonic head 400. In this embodiment, the peripheral wall 202 and the ultrasonic head 400 can be respectively provided with a plurality of magnetic attractors, and the magnetic attractors are evenly distributed along the circumferential direction of the peripheral wall 202 and the ultrasonic head 400, so as to ensure the force between the fixing piece 200 and the ultrasonic head 400 is uniform.

In the fifth embodiment, referring to FIG. 13 to FIG. 18 together, there is also provided an ultrasound device assembling method, comprising: assembling a body 100; arranging an ultrasonic head 400 to connected to the body 100 through a lead wire 101 or wirelessly, wherein the ultrasonic head 400 is configured to generate ultrasound; and arranging a fixing piece 200, wherein the fixing piece 200 comprises a cover plate 201 and a peripheral wall 202 circumferentially and vertically connected with the cover plate 201, and arranging the fixing piece 200 comprises sleeving the peripheral wall 202 on the ultrasonic head 400 to form an accommodation space between the ultrasonic head 400 and the cover plate 201; providing a first through hole 203 on the cover plate 201, and configuring the first through hole 203 to communicate with the accommodation space; and arranging an ultrasonic coupling gel 300 configured for ultrasound to pass through, wherein the ultrasonic coupling gel 300 comprises a first connecting part 302 and a protruding part 301, the first connecting part 302 is accommodated in the accommodation space and attached to the ultrasonic head 400 and the cover plate 201 respectively, and arranging the ultrasonic coupling gel 300 comprises arranging the protruding part 301 on the first connecting part 302 and exposing the protruding part 301 outside the fixing piece 200 through the first through hole 203. In this embodiment, the ultrasonic coupling gel 300 is made of solid coupling gel. The ultrasonic coupling gel 300 has a certain degree of elasticity, so as to improve the comfort of contact with the skin and avoid scratching the skin. At the same time, the ultrasonic coupling gel 300 has the contact between the ultrasonic head 400 and the skin to reduce acoustic resistance, reduce the reflection loss of ultrasonic energy on the skin, and play a lubricating role. It can be understood that in other embodiments, the ultrasonic coupling gel 300 can be replaced by other solid gels, including but not limited to coupling gels, aqueous polymer gels, acrylic resin gels, or solid gels made of other materials.

In some embodiments, the ultrasonic head 400 comprises a first clamping part 403, and the first clamping part 403 comprises one or more first protruding structures; the peripheral wall 202 that is not on the side of the cover plate 201 comprises a second clamping part 204, and the second clamping part 204 is around the peripheral wall 202 of the circumferential protruding structure, so that the peripheral wall 202 inside the formation of an annular groove 205; the first clamping part 403 protruded into the annular groove 205 of the second clamping part 204, and the peripheral wall 202 is configured to be sleeved on the ultrasonic head 400; and the circumferential direction of the circumferential protruding structure comprising corners 206 bending toward the inner part of the peripheral wall 202, and the corners 206 guide and cooperate with the first clamping part 403 in the first protruding structure to accelerate assemblance of the fixing piece 200 and the ultrasonic head 400.

To sum up, the implementation of the embodiment of the present disclosure will have the following beneficial effects: the above-mentioned ultrasonic device, in addition to having excellent ultrasonic performance, can also realize the rapid assembly of the ultrasonic coupling gel 300, and avoid the bending of the ultrasonic coupling gel 300 during the assembly process, thereby avoiding the ultrasonic coupling gel 300 from breaking during the subsequent use of the ultrasonic device. Specifically, the ultrasonic device includes an ultrasonic head 400 connected to the body 100 through a lead wire 101 or wirelessly, a fixing piece 200, and an ultrasonic coupling gel 300. Wherein, the fixing piece 200 includes a cover plate 201 and a peripheral wall 202 circumferentially connected with the cover plate 201, and the peripheral wall 202 is sleeved on the ultrasonic head 400, so as to realize the connection between the fixing piece 200 and the ultrasonic head 400, and at the same time form an accommodation space between the ultrasonic head 400 and the cover plate 201. The ultrasonic coupling gel 300 includes a first connecting part 302 that is accommodated in the accommodation space and respectively attached to the ultrasonic head 400 and the cover plate 201, so that when the ultrasonic coupling gel 300 is connected to the ultrasonic head 400, bending of the ultrasonic coupling gel 300 can be avoided. By arranging the first connecting part 302 between the ultrasonic head 400 and the cover plate 201 to form a close connection between the ultrasonic coupling gel 300 and the ultrasonic head 400, the force on the first connecting part 302 will be more uniform, avoiding or reducing stress concentration, and thus reducing the risk of fracture of the ultrasonic coupling gel 300. Further, the cover plate 201 is provided with a first through hole 203, and the first connecting part 302 is provided with a protruding part 301 that can be exposed outside the fixing piece 200 through the first through hole 203, so that the protruding part 301 can contact the skin and reduce the friction between the ultrasonic head 400 and the skin so that the ultrasonic head 400 can slide flexibly and is easy to clean, and the ultrasound generated by the ultrasonic head 400 can act on the treatment site through the ultrasonic coupling gel 300.

In some embodiments, the ultrasonic head comprises a second connecting part and an ultrasonic head output part; the ultrasonic head output part protrudes from the second connecting part, and the first clamping part is arranged on the ultrasonic head output part; the second connecting part is in contact with the circumferential protruding structure or the one or more second protruding structures to limit the ultrasonic head to move toward a side of the fixing piece, and to prevent the ultrasonic coupling gel from being squeezed, deformed, or crushed.

In some embodiments, the first clamping part comprises a plurality of the one or more first protruding structures, and the plurality of the one or more first protruding structures are evenly distributed; and the plurality of the one or more first protruding structures and the second clamping part are clamped so that the peripheral wall is firmly set on the ultrasonic head.

In some embodiments, the method further includes fixing an ultrasonic fixing sticker at the bottom of the fixing piece, where a second through hole is provided on the ultrasonic fixing sticker, the protruding part is exposed outside the ultrasonic fixing sticker through the second through hole; and the ultrasonic fixing sticker is pasted on a body to be treated, so that the ultrasonic head and the ultrasonic coupling gel are fixed on the body to be treated.

In some embodiments, the circumferential protruding structure comprises one or more vacant portions, the one or more vacant portions are arranged on a side of the circumferential protruding structure that is away from the peripheral wall; and the one or more vacant portions penetrate partially in a vertical direction of the peripheral wall through the circumferential protruding structure to facilitate replacement of the ultrasonic coupling gel.

In some embodiments, the method further includes configuring each of the one or more vacant portions to comprise a small end close to an end of the peripheral wall and a large end far away from the end of the peripheral wall, so as to facilitate elastic deformation of the circumferential protruding structure; and configuring the small end to be arc-shaped, so as to avoid fracture and further facilitate the elastic deformation of the circumferential protruding structure; and disposing a circular arc-transition between two sides of the each of the one or more vacant portions away from the end of the peripheral wall and the circumferential protruding structure, so as to further facilitate the replacement of the ultrasonic coupling gel and to avoid scratching body parts.

In some embodiments, the method further comprises arranging the peripheral wall comprise a first plurality of magnetic attractors evenly distributed along a circumferential direction of the peripheral wall, the ultrasonic head to comprise a second plurality of magnetic attractors evenly distributed along the circumferential direction of the ultrasonic head, and the first plurality of magnetic attractors and the second plurality of magnetic attractors to cooperate to ensure a uniform force between the fixing piece and the ultrasonic head; where the first plurality of magnetic attractors are arranged on a surface of the peripheral wall other than a horizontal end surface of the peripheral wall, and the second plurality of magnetic attractors are arranged on a surface of the ultrasonic head other than a horizontal end surface of the ultrasonic head.

In some embodiments, referring to FIG. 14 to FIG. 17, the ultrasonic head 400 comprises a second connecting part 402 and an ultrasonic head output part 401; the ultrasonic head 400 is connected to the body 100 through a lead wire 101 or wirelessly; the ultrasonic head output part 401 protrudes from the second connecting part 402, and the first clamping part 403 is arranged on the ultrasonic head output part 401; the second connecting part 402 is in contact with the circumferential protruding structure to limit the ultrasonic head 400 to move toward a side of the fixing piece 200, and to prevent the ultrasonic coupling gel 300 from being squeezed, deformed, or crushed. The second connecting part 402 acts as a stopper to limit the movement of the fixing piece 200 to the side of the ultrasonic head 400, thereby reducing the size of the accommodation space and causing the second connecting part 402 to be deformed or even crushed.

In some embodiments, referring to FIG. 17, the first clamping part 403 comprises a plurality of the first protruding structures, and the plurality of the first protruding structures are evenly distributed; the plurality of the first protruding structures and the second clamping part 204 are clamped so that the peripheral wall 202 is more firmly set on the ultrasonic head 400.

In some embodiments, referring to FIG. 15, and FIG. 18, an ultrasonic fixing sticker 500 fixed at the bottom of the fixing piece 200, a second through hole 501 is provided on the ultrasonic fixing sticker 500, the protruding part 301 is exposed outside the ultrasonic fixing sticker 500 through the second through hole 501; the ultrasonic fixing sticker 500 is pasted on the body 100 to be treated, so that the ultrasonic head 400 and the ultrasonic coupling gel 300 are fixed on the body 100 to be treated.

In some embodiments, referring to FIG. 18, the circumferential protruding structure comprises one or more vacant portions 210, the one or more vacant portions 210 are arranged on a side of the circumferential protruding structure that is away from the peripheral wall 202; and the one or more vacant portions 210 penetrate partially in a vertical direction of the peripheral wall 202 through the circumferential protruding structure to facilitate replacement of the ultrasonic coupling gel 300. In this way, the socket between the fixing piece 200 and the ultrasonic head 400 is realized through the elastic abutment of the circumferential protruding structure.

In some embodiments, referring to FIG. 18, configuring each of the one or more vacant portions 210 comprises a small end close to the end of the peripheral wall 202 and a large end far away from the end of the peripheral wall 202, so as to facilitate elastic deformation of the circumferential protruding structure; and configuring the small end is arc-shaped, so as to avoid fracture and further facilitate the elastic deformation of the circumferential protruding structure; and disposing a circular arc-transition is disposed between two sides of the each of the one or more vacant portions 210 away from an end of the peripheral wall 202 and the circumferential protruding structure, so as to further facilitate the replacement of the ultrasonic coupling gel 300 and to avoid scratching body parts.

In some embodiments, referring to FIG. 15 to FIG. 17 together, the peripheral wall 202 comprises a first plurality of magnetic attractors evenly distributed along a circumferential direction of the peripheral wall 202, the ultrasonic head 400 comprises a second plurality of magnetic attractors evenly distributed along the circumferential direction of the ultrasonic head 400, the first plurality of magnetic attractors and the second plurality of magnetic attractors cooperate to ensure a uniform force between the fixing piece 200 and the ultrasonic head 400; wherein the first plurality of magnetic attractors are arranged on a surface of the peripheral wall 202 other than a horizontal end surface of the peripheral wall 202, and the second plurality of magnetic attractors are arranged on a surface of the ultrasonic head 400 other than a horizontal end surface of the ultrasonic head 400. In this embodiment, the peripheral wall 202 and the ultrasonic head 400 can be respectively provided with a plurality of magnetic attractors, and the magnetic attractors are evenly distributed along the circumferential direction of the peripheral wall 202 and the ultrasonic head 400, so as to ensure the force between the fixing piece 200 and the ultrasonic head 400 is uniform.

Figure 19:
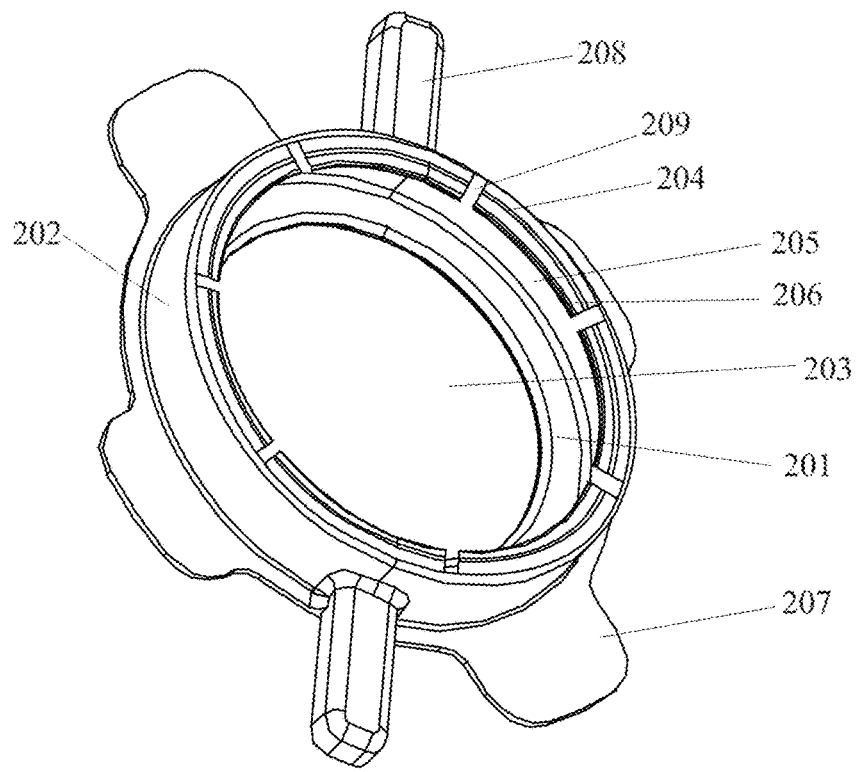
FIG. 19 is a schematic diagram of the fixing piece of the ultrasound device in the sixth embodiment.

In the sixth embodiment, referring to FIG. 19 to describe the ultrasonic device provided by the present disclosure. This embodiment differs from the fifth embodiment in that: the second clamping part 204 is around the peripheral wall 202 of one or more second protruding structures, the circumferential direction of the second protruding structure comprising corners 206 bending toward the inner part of the peripheral wall 202, and the corners 206 guide and cooperate with the first clamping part 403 in the first protruding structure to accelerate assemblance of the fixing piece 200 and the ultrasonic head 400.

In some embodiments, referring to FIG. 19, the ultrasonic head 400 comprises a second connecting part 402 and an ultrasonic head output part 401; the ultrasonic head 400 is connected to the body 100 through a lead wire 101 or wirelessly; the ultrasonic head output part 401 protrudes from the second connecting part 402, and the first clamping part 403 is arranged on the ultrasonic head output part 401; the second connecting part 402 is in contact with the second protruding structure to limit the ultrasonic head 400 to move toward a side of the fixing piece 200, and to prevent the ultrasonic coupling gel 300 from being squeezed, deformed, or crushed. The second connecting part 402 acts as a stopper to limit the movement of the fixing piece 200 to the side of the ultrasonic head 400, thereby reducing the size of the accommodation space and causing the second connecting part 402 to be deformed or even crushed.

In some embodiments, referring to FIG. 19, the second clamping part 204 is a plurality of the second protruding structures, and the gap 209 between the plurality of the second protruding structures is less than the width of the first protruding structure, to prevent the first clamping part 403 from coming out of the gap.

Implementing the embodiments of the present disclosure will have following beneficial effects:

The above-mentioned ultrasonic device, in addition to having excellent ultrasonic performance, can also realize the rapid assembly of the ultrasonic coupling gel, and avoid the bending of the ultrasonic coupling gel during the assembly process, thereby avoiding the ultrasonic coupling gel from breaking during the subsequent use of the ultrasonic device. Specifically, the ultrasonic device includes an ultrasonic head connected to the body through a lead wire or wirelessly, a fixing piece, and an ultrasonic coupling gel. Wherein, the fixing piece includes a cover plate and a peripheral wall circumferentially connected with the cover plate, and the peripheral wall is sleeved on the ultrasonic head, so as to realize the connection between the fixing piece and the ultrasonic head, and at the same time form an accommodation space between the ultrasonic head and the cover plate. The ultrasonic coupling gel includes a first connecting part that is accommodated in the accommodation space and respectively attached to the ultrasonic head and the cover plate, so that when the ultrasonic coupling gel is connected to the ultrasonic head, bending of the ultrasonic coupling gel can be avoided. By arranging the first connecting part between the ultrasonic head and the cover plate to form a close connection between the ultrasonic coupling gel and the ultrasonic head, the force on the first connecting part will be more uniform, avoiding or reducing stress concentration, and thus reducing the risk of fracture of the ultrasonic coupling gel. Further, the cover plate is provided with a first through hole, and the first connecting part is provided with a protruding part that can be exposed outside the fixing piece through the first through hole, so that the protruding part can contact the skin and reduce the friction between the ultrasonic head and the skin so that the ultrasonic head can slide flexibly and is easy to clean, and the ultrasound generated by the ultrasonic head can act on the treatment site through the ultrasonic coupling gel.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

These and other advantages of the disclosure will be further understood and appreciated by those skilled in the art by reference to the following written specification, claims and appended drawings.

Because many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the disclosure should be determined by the appended claims and their legal equivalence.

What is claimed is:

1. An ultrasound device, comprising:
a body;
an ultrasonic head, configured to be connected to the body through a lead wire or wirelessly and configured to generate ultrasound; and
a fixing piece comprising a cover plate and a peripheral wall circumferentially and vertically connected with the cover plate; wherein the peripheral wall is sleeved on the ultrasonic head to form an accommodation space between the ultrasonic head and the cover plate; a first through hole is provided on the cover plate, and the first through hole communicates with the accommodation space; and
an ultrasonic coupling gel configured for ultrasound to pass through; wherein the ultrasonic coupling gel comprises a first connecting part and a protruding part; the first connecting part is accommodated in the accommodation space and directly attached to the ultrasonic head and the cover plate respectively and simultaneously; and the protruding part is arranged on the first connecting part and is exposed outside the fixing piece through the first through hole;
wherein, the ultrasonic head comprises a first clamping part, and the first clamping part comprises a plurality of first protruding structures, wherein the plurality of the first protruding structures are evenly distributed; a portion of the peripheral wall that is separate from a side of the cover plate comprises a second clamping part, and the second clamping part is around the peripheral wall of a circumferential protruding structure or one or more second protruding structures; an inner part of the peripheral wall comprises an annular groove that is coupled with the circumferential protruding structure or the one or more second protruding structures, the first clamping part protrudes into the annular groove of the second clamping part, and the peripheral wall is configured to be sleeved on the ultrasonic head;
wherein a circumferential direction of the circumferential protruding structure or the one or more second protruding structures comprises corners bending toward the inner part of the peripheral wall, and the corners guide and cooperate with the first clamping part in the plurality plurality of first protruding structures to accelerate assemblance of the fixing piece and the ultrasonic head;
wherein, the peripheral wall comprises a first plurality of magnetic attractors evenly distributed along a circumferential direction of the peripheral wall, the ultrasonic head comprises a second plurality of magnetic attractors evenly distributed along the circumferential direction of the ultrasonic head, and the first plurality of magnetic attractors and the second plurality of magnetic attractors cooperate to ensure a uniform force between the fixing piece and the ultrasonic head; and
wherein the first plurality of magnetic attractors are arranged on a surface of the peripheral wall other than a horizontal end surface of the peripheral wall, and the second plurality of magnetic attractors are arranged on a surface of the ultrasonic head other than a horizontal end surface of the ultrasonic head.

2. The ultrasound device of claim 1, wherein, the ultrasonic head comprises a second connecting part and an ultrasonic head output part; the ultrasonic head output part protrudes from the second connecting part, and the first clamping part is arranged on the ultrasonic head output part; and
wherein the second connecting part is in contact with the circumferential protruding structure or the one or more second protruding structures to limit the ultrasonic head to move toward a side of the fixing piece, and to prevent the ultrasonic coupling gel from being squeezed, deformed, or crushed.

3. The ultrasound device of claim 1, wherein, the ultrasonic coupling gel comprises water-based polymer gel or acrylic resin gel.

4. The ultrasound device of claim 1, wherein, the protruding part is attached to an inner wall of the first through hole on the cover plate.

5. The ultrasound device of claim 1, wherein a width of a gap between the one or more second protruding structures is less than a width of the plurality of first protruding structures.

6. The ultrasound device of claim 1, wherein the body is configured to be connected to one or more ultrasonic heads.

7. The ultrasound device according to claim 1, wherein an external side of the fixing piece is provided with a hand part to facilitate the user to take the fixing piece; and
wherein the hand part comprises a first hand part and a second had part evenly distributed on the peripheral wall.

8. The ultrasound device of claim 1, further comprising an ultrasonic fixing sticker fixed at the bottom of the fixing piece and a second through hole provided on the ultrasonic fixing sticker, wherein the protruding part is exposed outside the ultrasonic fixing sticker through the second through hole.

9. The ultrasound device of claim 8, wherein, an external side of the fixing piece is provided with a fixation part, the fixation part being connected with the ultrasonic fixing sticker.

10. The ultrasound device of claim 1, wherein, the circumferential protruding structure comprises one or more vacant portions, the one or more vacant portions are arranged on a side of the circumferential protruding structure that is away from the peripheral wall; and the one or more vacant portions penetrate partially in a vertical direction of the peripheral wall through the circumferential protruding structure to facilitate replacement of the ultrasonic coupling gel.

11. The ultrasound device of claim 10, wherein, each of the one or more vacant portions comprises a small end close to an end of the peripheral wall and a large end far away from the end of the peripheral wall, so as to facilitate elastic deformation of the circumferential protruding structure;
wherein the small end is arc-shaped, so as to avoid fracture and further facilitate the elastic deformation of the circumferential protruding structure; and
wherein a circular arc-transition is disposed between two sides of the each of the one or more vacant portions away from the end of the peripheral wall and the circumferential protruding structure, so as to further facilitate the replacement of the ultrasonic coupling gel and to avoid scratching body parts.

12. An ultrasound device assembling method, comprising:
assembling a body;

arranging an ultrasonic head to be connected to the body through a lead wire or wirelessly, wherein the ultrasonic head is configured to generate ultrasound;

arranging a fixing piece, wherein the fixing piece comprises a cover plate and a peripheral wall circumferentially and vertically connected with the cover plate, and arranging the fixing piece comprises sleeving the peripheral wall on the ultrasonic head to form an accommodation space between the ultrasonic head and the cover plate;

providing a first through hole on the cover plate, and configuring the first through hole to communicate with the accommodation space; and arranging an ultrasonic coupling gel configured for ultrasound to pass through, wherein the ultrasonic coupling gel comprises a first connecting part and a protruding part, the first connecting part is accommodated in the accommodation space and attached to the ultrasonic head and the cover plate respectively, and arranging the ultrasonic coupling gel comprises arranging the protruding part on the first connecting part and exposing the protruding part outside the fixing piece through the first through hole;

wherein, the ultrasonic head comprises a first clamping part, and the first clamping part comprises a plurality of first protruding structures, wherein the plurality of the first protruding structures are evenly distributed; a portion of the peripheral wall that is separate from a side of the cover plate comprises a second clamping part, and the second clamping part is around the peripheral wall of a circumferential protruding structure or one or more second protruding structures; an inner part of the peripheral wall comprises an annular groove that is coupled with the circumferential protruding structure or the one or more second protruding structures; the first clamping part protrudes into the annular groove of the second clamping part, and the peripheral wall is configured to be sleeved on the ultrasonic head;

wherein a circumferential direction of the circumferential protruding structure or the one or more second protruding structures comprises corners bending toward the inner part of the peripheral wall, and the corners guide and cooperate with the first clamping part in the plurality of first protruding structures to accelerate assemblance of the fixing piece and the ultrasonic head;

wherein arranging the peripheral wall to comprise a first plurality of magnetic attractors evenly distributed along a circumferential direction of the peripheral wall, the ultrasonic head comprises a second plurality of magnetic attractors evenly distributed along the circumferential direction of the ultrasonic head, and the first plurality of magnetic attractors and the second plurality of magnetic attractors cooperate to ensure a uniform force between the fixing piece and the ultrasonic head; and wherein the first plurality of magnetic attractors are arranged on a surface of the peripheral wall other than a horizontal end surface of the peripheral wall, and the second plurality of magnetic attractors are arranged on a surface of the ultrasonic head other than a horizontal end surface of the ultrasonic head.

13. The ultrasound device assembling method according to claim 12, wherein the ultrasonic head comprises a second connecting part and an ultrasonic head output part; the ultrasonic head output part protrudes from the second connecting part, and the first clamping part is arranged on the ultrasonic head output part; and wherein the second connecting part is in contact with the circumferential protruding structure or the one or more second protruding structures to limit the ultrasonic head to move toward a side of the fixing piece, and to prevent the ultrasonic coupling gel from being squeezed, deformed, or crushed.

14. The ultrasound device assembling method according to claim 12, the plurality of first protruding structures and the second clamping part are clamped so that the peripheral wall is firmly set on the ultrasonic head.

15. The ultrasound device assembling method according to claim 12, further comprising:

fixing an ultrasonic fixing sticker at the bottom of the fixing piece, wherein a second through hole is provided on the ultrasonic fixing sticker, the protruding part is exposed outside the ultrasonic fixing sticker through the second through hole, and the ultrasonic fixing sticker is pasted on a body to be treated, so that the ultrasonic head and the ultrasonic coupling gel are fixed on the body to be treated.

16. The ultrasound device assembling method according to claim 12, wherein an external side of the fixing piece is provided with a hand part to facilitate the user to take the fixing piece; and wherein the hand part comprises a first hand part and a second hand part evenly distributed on the peripheral wall.

17. The ultrasound device assembling method according to claim 12, wherein:

the circumferential protruding structure comprises one or more vacant portions, the one or more vacant portions are arranged on a side of the circumferential protruding structure that is away from the peripheral wall; and the one or more vacant portions penetrate partially in a vertical direction of the peripheral wall through the circumferential protruding structure to facilitate replacement of the ultrasonic coupling gel.

18. The ultrasound device assembling method according to claim 17, further comprising:

configuring each of the one or more vacant portions to comprise a small end close to an end of the peripheral wall and a large end far away from the end of the peripheral wall, so as to facilitate elastic deformation of the circumferential protruding structure; and configuring the small end to be arc-shaped, so as to avoid fracture and further facilitate the elastic deformation of the circumferential protruding structure; and disposing a circular arc-transition between two sides of the each of the one or more vacant portions away from the end of the peripheral wall and the circumferential protruding structure, so as to further facilitate the replacement of the ultrasonic coupling gel and to avoid scratching body parts.

* * * * *